US012285745B2

United States Patent
Hoke et al.

(10) Patent No.: US 12,285,745 B2
(45) Date of Patent: Apr. 29, 2025

(54) COORDINATED EMISSION CONTROL SYSTEM INCLUDING DIESEL OXIDATION CATALYST AND LOW TEMPERATURE $NO_x$ ADSORBER

(71) Applicant: BASF MOBILE EMISSIONS CATALYSTS LLC, Iselin, NJ (US)

(72) Inventors: Jeffrey B. Hoke, New Brunswick, NJ (US); Gerd Grubert, Hannover (DE); Alfred Punke, Schwuelper-Walle (DE)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 685 days.

(21) Appl. No.: 17/611,403

(22) PCT Filed: May 20, 2020

(86) PCT No.: PCT/US2020/033712
§ 371 (c)(1),
(2) Date: Nov. 15, 2021

(87) PCT Pub. No.: WO2020/236879
PCT Pub. Date: Nov. 26, 2020

(65) Prior Publication Data
US 2022/0241761 A1   Aug. 4, 2022

Related U.S. Application Data

(60) Provisional application No. 62/851,392, filed on May 22, 2019.

(51) Int. Cl.
*B01J 29/67* (2006.01)
*B01D 53/94* (2006.01)
(Continued)

(52) U.S. Cl.
CPC .......... *B01J 29/67* (2013.01); *B01D 53/9468* (2013.01); *B01J 21/04* (2013.01); *B01J 23/34* (2013.01);
(Continued)

(58) Field of Classification Search
CPC ...... F01N 3/2066; F01N 3/2828; F01N 3/103; F01N 2330/06; F01N 2370/02;
(Continued)

(56) References Cited

U.S. PATENT DOCUMENTS 4,961,917 A   10/1990  Byrne
5,516,497 A   5/1996  Speronello et al.
(Continued)

FOREIGN PATENT DOCUMENTS

CA   3052878 A1   8/2018
GB   2553431 A   3/2018
(Continued)

OTHER PUBLICATIONS

European Search Report for EP Patent Application No. 20809429.2, Issued on Apr. 26, 2023, 4 pages.
(Continued)

*Primary Examiner* — Kenneth J Hansen
*Assistant Examiner* — Kelsey L Stanek
(74) *Attorney, Agent, or Firm* — DLA Piper LLP (US)

(57) ABSTRACT

The present disclosure is directed to an emission treatment system for oxidation of hydrocarbons and carbon monoxide and for $NO_x$ abatement in an exhaust stream of a lean burn engine, the emission treatment system including a low-temperature $NO_x$ adsorber (LT-NA) that includes a molecular sieve impregnated with at least one PGM component positioned in fluid communication with the exhaust stream; and an oxidation catalyst that includes a refractory metal oxide support containing manganese impregnated with plati-
(Continued)

num positioned in fluid communication with the exhaust stream, each of the LT-NA and the oxidation catalyst being disposed on a substrate. The invention provides a catalyst article combining an oxidation catalyst with a LT-NA and a related method of treatment of an exhaust gas.

22 Claims, 13 Drawing Sheets

(51) Int. Cl.
*B01J 21/04* (2006.01)
*B01J 23/34* (2006.01)
*B01J 23/44* (2006.01)
*B01J 29/76* (2006.01)
*B01J 35/56* (2024.01)
*F01N 3/10* (2006.01)
*F01N 3/20* (2006.01)
*F01N 3/28* (2006.01)

(52) U.S. Cl.
CPC ............ *B01J 23/44* (2013.01); *B01J 29/763* (2013.01); *B01J 35/56* (2024.01); *F01N 3/103* (2013.01); *F01N 3/2066* (2013.01); *F01N 3/2828* (2013.01); *B01D 2255/1021* (2013.01); *B01D 2255/1023* (2013.01); *B01D 2255/9022* (2013.01); *F01N 2330/06* (2013.01); *F01N 2370/02* (2013.01); *F01N 2510/06* (2013.01)

(58) Field of Classification Search
CPC ..... F01N 2510/06; B01J 29/67; B01J 29/763; B01J 23/34; B01J 23/44; B01J 21/04; B01J 35/56; B01D 53/9468; B01D 2255/1021; B01D 2255/1023; B01D 2255/9022

USPC ........................................................ 422/171
See application file for complete search history.

(56) References Cited

U.S. PATENT DOCUMENTS

| | | |
|---|---|---|
| 6,171,556 B1 | 1/2001 | Burk et al. |
| 2012/0240554 A1 | 9/2012 | Qi et al. |
| 2014/0193306 A1 | 7/2014 | Kadono et al. |
| 2015/0165422 A1 | 6/2015 | Sung et al. |
| 2015/0273452 A1* | 10/2015 | Chiffey ................ B01J 37/0248 502/66 |
| 2017/0096923 A1 | 4/2017 | Chiffey et al. |
| 2017/0304805 A1 | 10/2017 | Xu et al. |
| 2017/0333883 A1 | 11/2017 | Mohanan et al. |
| 2018/0056278 A1 | 3/2018 | Feaviour |
| 2018/0065086 A1 | 3/2018 | Bidal et al. |
| 2019/0015781 A1 | 1/2019 | Wei et al. |
| 2019/0046958 A1* | 2/2019 | Wei ........................ B01J 21/066 |
| 2020/0384449 A1 | 12/2020 | Sung et al. |

FOREIGN PATENT DOCUMENTS

| | | | |
|---|---|---|---|
| WO | 2010/083315 A2 | 7/2010 | |
| WO | WO-2016130456 A1 * | 8/2016 | ......... B01D 53/9418 |
| WO | 2018/146602 A1 | 8/2018 | |

OTHER PUBLICATIONS

International Search Report for PCT Patent Application No. PCT/US2020/033712, Issued on Aug. 26, 2020, 4 pages.

Heck, et al., "The Preparation of Catalytic Materials: Carriers, Active Components and Monolithic Substrates, Catalytic Air Pollution Control: Commercial Technology", Second Edition, Jul. 24, 2002, pp. 18-19.

* cited by examiner

Fig. 1A
Fig. 1B
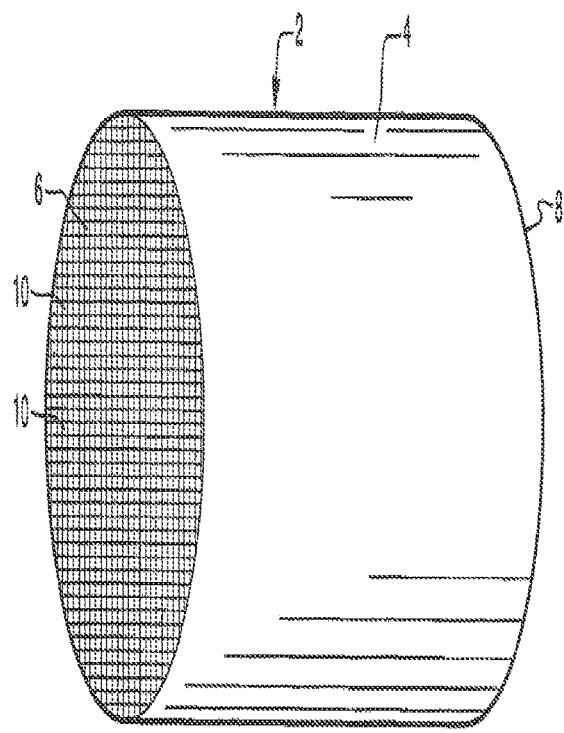
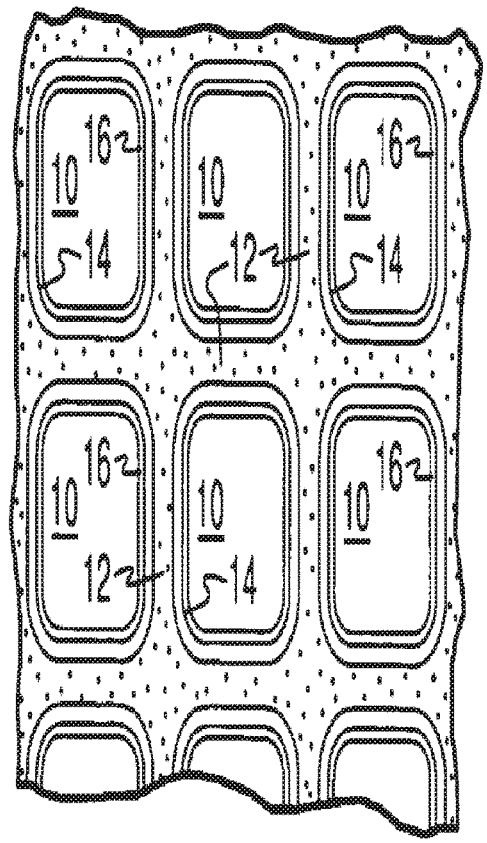

COORDINATED EMISSION CONTROL SYSTEM INCLUDING DIESEL OXIDATION CATALYST AND LOW TEMPERATURE NO$_x$ ADSORBER

CROSS-REFERENCE TO RELATED APPLICATIONS

This application is a national stage of PCT/US2020/033712, filed on May 20, 2020 which claims the benefit of priority from U.S. Provisional Application No. 62/851,392, filed on May 22, 2019, which are hereby incorporated in their entirety by reference in this application.

FIELD OF THE INVENTION

The present invention is directed to catalyst articles, emission control systems, and methods suitable for treating the exhaust gas stream of an internal combustion engine to reduce emissions of nitrogen oxides (NO$_x$).

BACKGROUND OF THE INVENTION

Environmental regulations for emissions of internal combustion engines are becoming increasingly stringent throughout the world. Operation of a lean-burn engine, for example a diesel engine, provides the user with excellent fuel economy due to its operation at high air/fuel ratios under fuel-lean conditions. However, diesel engines also emit exhaust gas emissions containing particulate matter (PM), unburned hydrocarbons (HC), carbon monoxide (CO), and nitrogen oxides (NO$_x$), wherein NO$_x$ describes various chemical species of nitrogen oxides, including nitrogen monoxide and nitrogen dioxide, among others. NO$_x$ are harmful components of atmospheric pollution. Various methods have been used for the treatment of NO$_x$-containing gas mixtures to decrease atmospheric pollution.

An effective method to reduce NO$_x$ from the exhaust of lean-burn engines requires reaction of NO$_x$ under lean burn engine operating conditions with a suitable reductant in the presence of a selective catalytic reduction (SCR) catalyst component. The SCR process typically uses as the reductant ammonia or a hydrocarbon in the presence of atmospheric oxygen, resulting in the formation predominantly of nitrogen and steam:

4NO+4NH$_3$+O$_2$→4N$_2$+6H$_2$O      (standard SCR reaction)

2NO$_2$+4NH$_3$+O$_2$→3N$_2$+6H$_2$O      (slow SCR reaction)

NO+NO$_2$+2NH$_3$→2N$_2$+3H$_2$O      (fast SCR reaction)

Current catalysts employed in the SCR process include molecular sieves, such as zeolites, ion-exchanged with a catalytic metal such as iron or copper. A useful SCR catalyst component is able to effectively catalyze the reduction of the NO$_x$ exhaust component at temperatures below 600° C. so that reduced NO$_x$ levels can be achieved even under conditions of low load, which typically are associated with lower exhaust temperatures.

One problem encountered in the treatment of automotive exhaust gas streams is the so-called "cold start" period, which is the time period at the beginning of the treatment process, when the exhaust gas stream and the exhaust gas treatment system are at low temperatures (i.e., below 150° C.). At these low temperatures, exhaust gas treatment systems generally do not display sufficient catalytic activity for effectively treating hydrocarbons (HC), nitrogen oxides (NO$_x$) and/or carbon monoxide (CO) emissions. In general, catalytic components such as SCR catalyst components are very effective in converting NO$_x$ to N$_2$ at temperatures above 200° C. but do not exhibit sufficient activities at lower temperature regions (<200° C.) such as those found during cold-start or prolonged low-speed city driving.

Another problem encountered with SCR catalysts is the sensitivity of the SCR reactions to the ratio of NO$_2$ to total NO$_x$ in the feed gas to the SCR catalyst. In diesel systems, this ratio is highly dependent on the composition of the diesel oxidation catalyst (DOC) typically placed upstream of an SCR catalyst.

It would be highly desirable to provide an improved emission treatment system that provides highly efficient SCR catalyst performance over a wide range of operating temperatures.

SUMMARY OF THE INVENTION

The present disclosure is directed to the use of a low-temperature NO$_x$ adsorber (LT-NA) composition (e.g., Pd/zeolite) for adsorbing NO$_x$ from an exhaust gas at low temperature in combination with the use of a diesel oxidation catalyst (DOC) exhibiting enhanced NO$_2$ make for efficient removal of the NO$_x$ desorbed from the LT-NA by a downstream SCR component. More specifically, the DOC advantageously comprises a manganese-containing support material (e.g., Mn/Al$_2$O$_3$), which raises the NO$_2$/NO$_x$ ratio of the treated exhaust gas such that downstream operation of an SCR catalyst is improved.

In one aspect, the disclosure provides an emission treatment system for oxidation of hydrocarbons and carbon monoxide and for NO$_x$ abatement in an exhaust stream of a lean burn engine, the emission treatment system comprising: a low-temperature NO$_x$ adsorber (LT-NA) comprising a molecular sieve impregnated with at least one PGM component positioned in fluid communication with the exhaust stream; and an oxidation catalyst comprising a refractory metal oxide support containing manganese impregnated with platinum positioned in fluid communication with the exhaust stream, each of the LT-NA and the oxidation catalyst being disposed on a substrate. In certain embodiments, the LT-NA and the oxidation catalyst are: (1) layered on the same substrate with the LT-NA present in a first layer and the oxidation catalyst present in a second layer, the first layer positioned closer to the substrate than the second layer and at least partially overlapped by the second layer, or (2) in a zoned configuration on the same substrate with the LT-NA in an upstream zone and the oxidation catalyst in a downstream zone; or (3) the LT-NA is present on a first substrate and the oxidation catalyst is present on a second substrate, the first substrate positioned upstream of the second substrate. The emission treatment system may further include at least one selective catalytic reduction (SCR) catalyst positioned downstream from both the LT-NA and the oxidation catalyst, and optionally one or more of the following: an ammonia or ammonia precursor injection component, a catalyzed soot filter (CSF), and an ammonia oxidation (AMOX) catalyst.

For example, the LT-NA and the oxidation catalyst can be disposed on the same substrate in a zoned configuration, the substrate having an inlet end and an outlet end defining an overall length; the LT-NA can be disposed on the substrate extending from the inlet end to a length of from about 20% to about 100% of the overall length; and the oxidation catalyst can be disposed on the substrate extending from the outlet end to a length of from about 20% to about 100% of the overall length, the oxidation catalyst optionally overlapping at least a portion of the LT-NA. In certain embodiments, the LT-NA is disposed on the substrate extending from the inlet end to a length of from about 40% to about 100% of the overall length, and the oxidation catalyst is disposed on the substrate extending from the outlet end to a length of from about 40% to about 100% of the overall length. Both the LT-NA and the oxidation catalyst can be disposed on, for example, a flow-through substrate in the form of a honeycomb having a plurality of longitudinally-extending gas flow passages extending from an inlet to an outlet.

If desired, the oxidation catalyst is zone coated with a second oxidation catalyst comprising a refractory metal oxide support impregnated with one or more platinum group metal (PGM) components, wherein the second oxidation catalyst is substantially free of manganese and located upstream of the oxidation catalyst.

The molecular sieve can have a framework type selected from the group consisting of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, CHI, CLO, CON, CZP, DAC, DDR, DFO, DFT, DOH, DON, EAB, EDI, EEI, EMT, EON, EPI, ERI, ESV, ETR, EUO, EZT, FAU, FER, FRA, GIS, GIU, GME, GON, GOO, HEU, IFR, IFY, IHW, IMF, IRN, ISV, ITE, ITG, ITH, ITW, IWR, IWS, IWV, IWW, JBW, JRY, JSR, JST, KFI, LAU, LEV, LIO, LIT, LOS, LOV, LTA, LTF, LTL, LTN, MAR, MAZ, MEI, MEL, MEP, MER, MFI, MFS, MON, MOR, MOZ, MRE, MSE, MSO, MTF, MTN, MTT, MVY, MTW, MWF, MWW, NAB, NAT, NES, NON, NPO, NPT, NSI, OBW, OFF, OKO, OSI, OSO, OWE, PAR, PAU, PCR, PHI, PON, PUN, RHO, RON, RRO, RSN, RTE, RTH, RUT, RWR, RWY, SAF, SAO, SAS, SAT, SAV, SBE, SBS, SBT, SCO, SEW, SFE, SFF, SFG, SFH, SFN, SFO, SFS, SFW, SGF, SGT, SIV, SOD, SOF, SOS, SSF, SSY, STF, STI, STO, STT, STW, SVR, SZR, TER, THO, TON, TSC, TUN, UEI, UFI, UOS, UOZ, USI, UTL, UWY, VET, VFI, VNI, VSV, WIE, WEN, YUG, ZON, and mixtures or intergrowths thereof. In particular embodiments, the molecular sieve has a framework type selected from the group consisting of LEV, CHA, and FER. Advantageously, the molecular sieve is an aluminosilicate zeolite. In certain embodiments, the molecular sieve contains channels defined by rings of at least 10 members.

The oxidation catalyst may also include palladium, rhodium, or combinations thereof. Example oxidation catalysts comprise platinum in an amount in the range of about 10 g/ft$^3$ to 100 g/ft$^3$ impregnated on the refractory metal oxide support containing manganese, such as at least about 40 g/ft$^3$ platinum (or at least about 45, or at least about 50, or at least about 55, or at least about 60, or at least about 65, or at least about 70, or at least about 75, or at least about 80) impregnated on the refractory metal oxide support containing manganese. In some embodiments, the platinum impregnated on the refractory metal oxide support containing manganese is in the form of nanoparticles having an average particle size of about 1 to about 10 nm. The LT-NA can include palladium as the sole PGM component in certain embodiments.

The refractory metal oxide support typically comprises alumina, silica, zirconia, titania, ceria, or combinations thereof. In certain embodiments, the manganese content of the refractory metal oxide support is in the range of about 0.1% to about 30% by weight, based on the total weight of the support, such as in the range of about 3 to about 10% by weight. The manganese is typically present in a form selected from the group consisting of a Mn-containing solid solution with the refractory metal oxide, Mn surface dispersed on the refractory metal oxide by impregnation, and discrete manganese oxide particles on the refractory metal oxide particles.

In another aspect, the present disclosure includes a method for oxidizing hydrocarbons and abating $NO_x$ in an exhaust stream from a lean burn engine, the method comprising contacting the exhaust gas stream with the emission treatment system according to any embodiments set forth herein.

In yet another aspect, the present disclosure includes a catalyst article for treatment of exhaust from a lean burn engine, comprising: a substrate having an inlet end and an outlet end defining an overall length; a low-temperature $NO_x$ adsorber (LT-NA) comprising a molecular sieve impregnated with at least one PGM component disposed on the substrate (such as any embodiment of the LT-NA disclosed herein); and an oxidation catalyst comprising a refractory metal oxide support containing manganese impregnated with platinum disposed on the substrate (such as any embodiment of the oxidation catalyst disclosed herein), wherein the LT-NA and the oxidation catalyst are: (1) layered on the substrate with the LT-NA present in a first layer and the oxidation catalyst present in a second layer, the first layer positioned closer to the substrate than the second layer and at least partially overlapped by the second layer, or (2) in a zoned configuration on the same substrate with the LT-NA in an upstream zone and the oxidation catalyst in a downstream zone. For example, the LT-NA and the oxidation catalyst are disposed on the substrate in a zoned configuration, the substrate having an inlet end and an outlet end defining an overall length; wherein the LT-NA is disposed on the substrate extending from the inlet end to a length of from about 20% to about 100% of the overall length; and wherein the oxidation catalyst is disposed on the substrate extending from the outlet end to a length of from about 20% to about 100% of the overall length, the oxidation catalyst optionally overlapping at least a portion of the LT-NA. In some embodiments, the LT-NA is disposed on the substrate extending from the inlet end to a length of from about 40% to about 100% of the overall length, and the oxidation catalyst is disposed on the substrate extending from the outlet end to a length of from about 40% to about 100% of the overall length. In certain embodiments, the oxidation catalyst is zone coated with a second oxidation catalyst comprising a refractory metal oxide support impregnated with one or more platinum group metal (PGM) components, wherein the second oxidation catalyst is substantially free of manganese and located upstream of the oxidation catalyst.

These and other features, aspects, and advantages of the disclosure will be apparent from the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, in which reference numerals refer to components of exemplary embodiments of the invention. The drawings are exemplary only, and should not be construed as limiting the invention. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIG. 1A is a perspective view of a honeycomb-type substrate which may comprise a catalyst composition washcoat in accordance with the present disclosure;

FIG. 1B is a partial cross-sectional view enlarged relative to FIG. 1A and taken along a plane parallel to the end faces of the substrate of FIG. 1A, which shows an enlarged view of a plurality of the gas flow passages shown in FIG. 1A, in an embodiment wherein the substrate is a flow-through substrate;

DETAILED DESCRIPTION OF THE INVENTION

Figure 2:
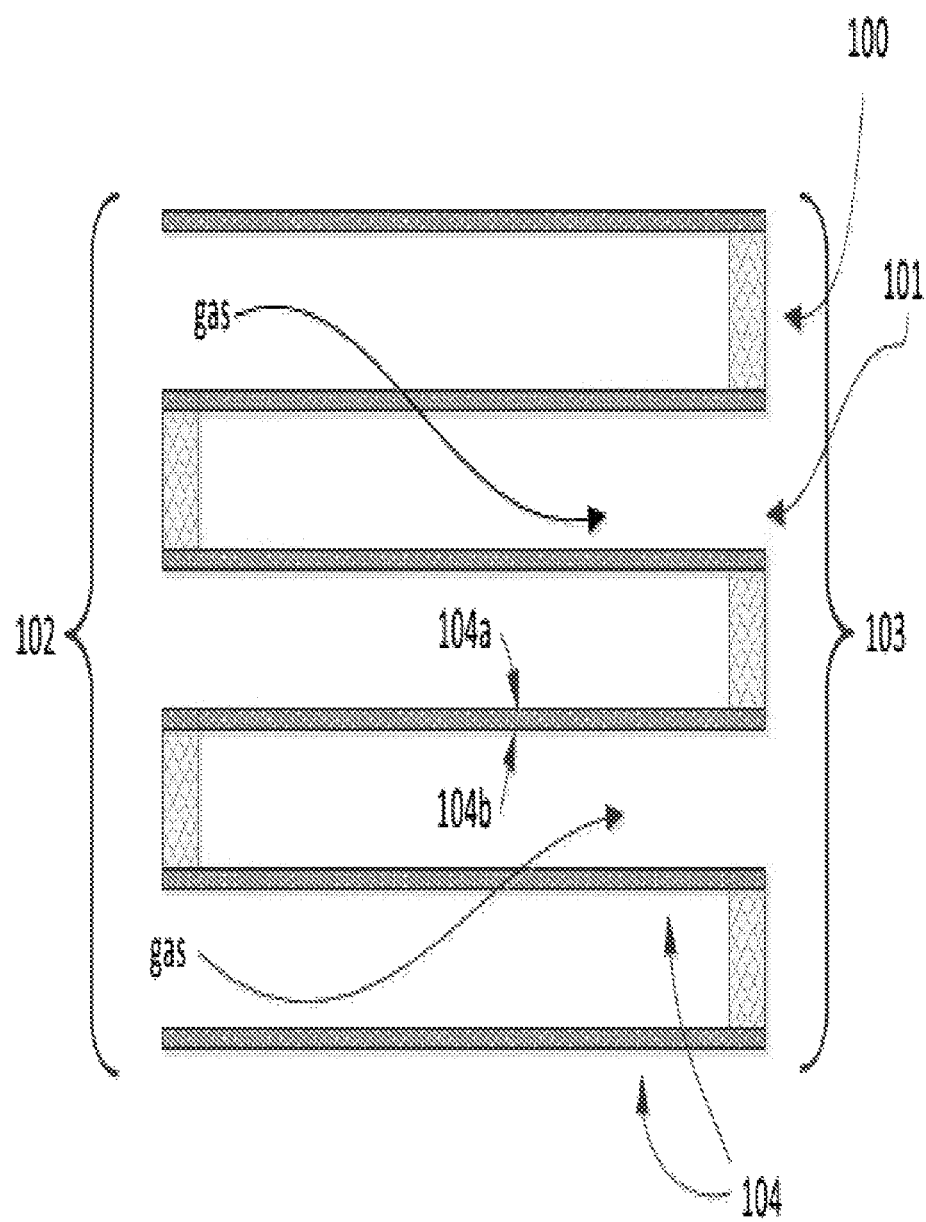
FIG. 2 is a cutaway view of a section enlarged relative to FIG. 1A, wherein the honeycomb-type substrate in FIG. 1A represents a wall-flow filter.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Definitions

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0.

The term "abatement" means a decrease in the amount, caused by any means.

The term "adsorbent" refers to a material that adsorbs and/or absorbs a desired substance, in this disclosure, $NO_x$. Adsorbents may advantageously adsorb and/or absorb (store) a substance at a certain temperature and desorb (release) the substance at a higher temperature.

The term "associated" means for instance "equipped with", "connected to" or in "communication with", for example "electrically connected" or in "fluid communication with" or otherwise connected in a way to perform a function. The term "associated" may mean directly associated with or indirectly associated with, for instance through one or more other articles or elements.

The term "catalyst" refers to a material that promotes a chemical reaction. The catalyst includes the "catalytically active species" and the "support" that carries or supports the active species. For example, zeolites are supports for palladium active catalytic species. Likewise, refractory metal oxide particles may be a support for platinum group metal catalytic species. The catalytically active species are also termed "promoters" as they promote chemical reactions.

The term "catalytic article" in the invention means an article comprising a substrate having a catalyst coating composition.

The term "configured" as used in the description and claims is intended to be an open-ended term as are the terms "comprising" or "containing." The term "configured" is not meant to exclude other possible articles or elements. The term "configured" may be equivalent to "adapted."

"CSF" refers to a catalyzed soot filter, which is a wall-flow monolith. A wall-flow filter consists of alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, A CSF may carry oxidation catalysts to oxidize CO and HC to $CO_2$ and $H_2O$, or oxidize NO to $NO_2$ to accelerate the downstream SCR catalysis or to facilitate the oxidation of soot particles at lower temperatures. An SCR catalyst composition can also be coated directly onto a wall-flow filter, which is called a SCRoF.

"DOC" refers to a diesel oxidation catalyst, which converts hydrocarbons and carbon monoxide in the exhaust gas of a diesel engine. Typically, a DOC comprises one or more platinum group metals such as palladium and/or platinum; a support material such as alumina; a zeolite for HC storage; and optionally, promoters and/or stabilizers.

In general, the term "effective" means for example from about 35% to 100% effective, for instance from about 40%, about 45%, about 50% or about 55% to about 60%, about 65%, about 70%, about 75%, about 80%, about 85%, about 90% or about 95%, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold, and a downstream zone may be further away from the engine or manifold.

The term "in fluid communication" is used to refer to articles positioned on the same exhaust line, i.e., a common exhaust stream passes through articles that are in fluid communication with each other. Articles in fluid communication may be adjacent to each other in the exhaust line. Alternatively, articles in fluid communication may be separated by one or more articles, also referred to as "washcoated monoliths."

As used herein, "impregnated" or "impregnation" refers to permeation of the catalytic material into the porous structure of the support material.

The terms "on" and "over" and "overlapping" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

As used herein, the terms "nitrogen oxides" or "$NO_x$" designate the oxides of nitrogen, such as NO, $NO_2$ or $N_2O$.

"Substantially free" means "little or no" or "no intentionally added" and also having only trace and/or inadvertent amounts. For instance, in certain embodiments, "substantially free" means less than 2 wt % (weight %), less than 1.5 wt %, less than 1.0 wt %, less than 0.5 wt %, 0.25 wt % or less than 0.01 wt %, based on the weight of the indicated total composition.

As used herein, the term "washcoat" has its usual meaning in the art of a thin, adherent coating of a catalytic or other material applied to a substrate material, such as a honeycomb-type substrate, which is sufficiently porous to permit the passage of the gas stream being treated. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can be different in some way (e.g., may differ in physical properties thereof such as, for example particle size or crystallite phase) and/or may differ in the chemical catalytic functions. A washcoat is typically formed by preparing a slurry containing a specified solids content (e.g., 30-90% by weight) of catalyst in a liquid, which is then coated onto a substrate and dried to provide a washcoat layer.

"Weight percent (wt %)," if not otherwise indicated, is based on an entire composition free of any volatiles, that is, based on dry solids content. Unless otherwise indicated, all parts and percentages are by weight.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods. All U.S. patent applications, Pre-Grant publications and patents referred to herein are hereby incorporated by reference in their entireties.

In a first aspect, the invention provides an emission treatment system adapted for oxidation of hydrocarbons and carbon monoxide in an exhaust stream, as well as abatement of NOx in the exhaust stream. The emission treatment system of the invention provides coordinated function of an oxidation catalyst (i.e., a diesel oxidation catalyst or DOC) that oxidizes hydrocarbons and carbon monoxide and also promotes formation of $NO_2$, which can enhance downstream SCR catalyst activity, and a low-temperature $NO_x$ adsorber (LT-NA), which can provide adsorption of $NO_x$ at temperatures below the efficient operating temperature of a downstream SCR catalyst. Working together, the oxidation catalyst and the LT-NA can reduce $NO_x$ emissions downstream of an SCR catalyst. The invention also provides a catalyst article that includes both a DOC and a LT-NA composition as set forth herein.

Diesel Oxidation Catalyst (DOC)

The DOC composition used in the present invention includes a PGM component impregnated on a porous refractory metal oxide support. As used herein, "platinum group metal" or "PGM" refers to platinum group metals or oxides thereof, including platinum (Pt), palladium (Pd), ruthenium (Ru), rhodium (Rh), osmium (Os), iridium (Ir), and mixtures thereof. In certain embodiments, the platinum group metal comprises a combination of platinum and palladium, such as in a weight ratio of about 1:10 to about 10:1, more typically in a platinum to palladium equal to or greater than about 1.5:1, equal to or greater than about 2:1, or equal to or greater than about 5:1. The concentrations of PGM component (e.g., Pt, Pd or a combination thereof) can vary, but will typically be from about 0.1 wt. % to about 10 wt. % relative to the weight of the porous refractory oxide support material (e.g., about 1 wt. % to about 6 wt. % relative to the refractory oxide support). The DOC can further include hydrocarbon adsorbents, such as zeolites (e.g., Fe-Beta zeolites), and/or stabilizers or promoters (e.g., barium oxide).

As used herein, "porous refractory metal oxide" refers to porous metal-containing oxide materials exhibiting chemical and physical stability at high temperatures, such as the temperatures associated with diesel engine exhaust. Exemplary refractory oxides include alumina, silica, zirconia, titania, ceria, and physical mixtures or chemical combinations thereof, including atomically-doped combinations and including high surface area or activated compounds such as activated alumina. Exemplary combinations of metal oxides include alumina-zirconia, ceria-zirconia, alumina-ceria-zirconia, lanthana-alumina, lanthana-zirconia-alumina, baria-alumina, baria lanthana-alumina, baria lanthana-neodymia alumina, and alumina-ceria. Exemplary aluminas include large pore boehmite, gamma-alumina, and delta/theta alumina. Useful commercial aluminas include activated aluminas, such as high bulk density gamma-alumina, low or medium bulk density large pore gamma-alumina, and low bulk density large pore boehmite and gamma-alumina.

High surface area refractory oxide supports, such as alumina support materials, also referred to as "gamma alumina" or "activated alumina," typically exhibit a BET surface area in excess of 60 m$^2$/g, often up to about 200 m$^2$/g or higher. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by N$_2$ adsorption. Desirably, the active alumina has a specific surface area of 60 to 350 m$^2$/g, and typically 90 to 250 m$^2$/g.

At least a portion of the refractory metal oxide support used in the DOC of the invention contains manganese, and the manganese-containing refractory metal oxide support is impregnated with platinum. The manganese content of such a refractory metal oxide support is typically in the range of about 0.1% to about 30% (including 0.1, 0.5, 1.0, 1.5, 2.0, 2.5, 3.0, 4.0, 5.0, 6.0, 7.0, 8.0, 9.0, 10.0, 15.0, and 20.0%) by weight, based on the total weight of the refractory metal oxide support. In specific embodiments, the Mn content is in the range of about 3 to about 10% by weight. Without intending to be bound by theory, it is thought that manganese interacts beneficially with platinum to boost NO$_2$ formation, which can improve downstream SCR catalyst performance. In one or more embodiments, the combination of manganese and platinum, wherein platinum is supported on a manganese-containing support, results in a synergistic effect to improve NO oxidation and increase NO$_2$ formation. Methods for forming manganese-containing refractory metal oxide supports are described in US2015/0165422 to Sung et al., which is incorporated by reference herein in its entirety.

The Mn can be incorporated into the refractory metal oxide support in either bulk form or surface forms, or as discrete manganese oxide forms. In one or more embodiments, the Mn is derived from a soluble Mn species selected from Mn acetate, Mn, nitrate, Mn sulfate, or combinations thereof. In other embodiments, the Mn is derived from bulk Mn oxides selected from MnO, Mn$_2$O$_3$, MnO$_2$, and combinations thereof.

According to one or more embodiments, a refractory metal oxide support is impregnated with a Mn salt. As used herein, the term "impregnated" means that a Mn-containing solution is put into pores of a material such as a refractory metal oxide support. In certain embodiments, impregnation is achieved by incipient wetness, where a volume of diluted Mn-containing solution is approximately equal to the pore volume of the support bodies. Incipient wetness impregnation generally leads to a substantially uniform distribution of the solution of the precursor throughout the pore system of the material.

In other embodiments, the manganese can be included with the refractory oxide support by co-precipitating manganese and the refractory oxide support precursor, and then calcining the co-precipitated material so that the refractory oxide support material and the manganese are in solid solution together. Thus, according to one or more embodiments, mixed oxides containing oxides of manganese, aluminum, cerium, silicon, zirconium and titanium can be formed. The manganese can also be dispersed on the surface of the refractory oxide support as discrete manganese oxide particles.

The amount of platinum incorporated into the manganese-containing support can vary, but it has been determined that the amount of platinum is a factor in determining the overall efficiency of NO$_x$ reduction of an emission treatment system incorporating the oxidation catalyst. In certain embodiments, the amount of platinum is about 10 g/ft$^3$ to 100 g/ft$^3$ (based on the volume of an underlying substrate upon which the catalyst is disposed), including ranges such as at least about 40 g/ft$^3$, at least about 45 g/ft$^3$, at least about 50 g/ft$^3$, at least about 55 g/ft$^3$, at least about 60 g/ft$^3$, at least about 65 g/ft$^3$, at least about 70 g/ft$^3$, at least about 75 g/ft$^3$, or at least about 80 g/ft$^3$. Concentration of platinum, or any other composition, on a substrate refers to concentration per any one three-dimensional section or zone, for instance any cross-section of a substrate or of the entire substrate, and is typically expressed as g/ft$^3$ or g/in$^3$.

The oxidation catalyst of the invention can include additional refractory metal oxides in addition to the manganese-containing support, and such additional refractory metal oxides may also have PGM components impregnated thereon. For example, in certain embodiments, the oxidation catalyst includes two zone-coated compositions, a front or upstream zone comprising one or more PGM components impregnated on a refractory metal oxide support (and including optional additional ingredients such as hydrocarbon adsorbents, stabilizers, promoters, and the like), and which is typically substantially free of manganese, and a rear or downstream zone that includes the platinum-impregnated, manganese-containing refractory metal oxide support (and including optional additional ingredients such as hydrocarbon adsorbents, stabilizers, promoters, and the like). Alternatively, multiple refractory oxide supports containing PGM components (including the manganese-containing support) can be included in a single homogenous composition.

The oxidation catalysts are generally present on a substrate at a concentration of, for instance, from about 0.3 to 2.5 g/in$^3$, or from about 0.4 g/in$^3$, about 0.5 g/in$^3$, about 0.6 g/in$^3$, about 0.7 g/in$^3$, about 0.8 g/in$^3$, about 0.9 g/in$^3$ or about 1.0 g/in$^3$ to about 1.5 g/in$^3$, about 1.7 g/in$^3$, about 1.8 g/in$^3$, about 1.9 g/in$^3$, about 2.0 g/in$^3$, about 2.1 g/in$^3$, about 2.2 g/in$^3$, about 2.3 g/in$^3$ or about 2.5 g/in$^3$, based on the volume of the substrate.

Method of Making DOC Composition

Preparation of the PGM-impregnated refractory oxide material typically comprises impregnating the refractory oxide support material in particulate form with a PGM solution, such as one or more of a platinum solution and a palladium solution. Multiple PGM components (e.g., platinum and palladium) can be impregnated at the same time or separately, and can be impregnated on the same support particles or separate support particles using an incipient wetness technique. The support particles are typically dry enough to absorb substantially all of the solution to form a moist solid. Aqueous solutions of water soluble compounds or complexes of the PGM component are typically utilized, such as palladium or platinum nitrate, tetraammine palladium or platinum nitrate, or tetraammine palladium or platinum acetate.

Following treatment of the support particles with the PGM solution, the particles are dried, such as by heat treating the particles at elevated temperature (e.g., 100-150° C.) for a period of time (e.g., 1-3 hours), and then calcining to convert the PGM components to a more catalytically active form. An exemplary calcination process involves heat treatment in air at a temperature of about 400-550° C. for 1-3 hours. The above process can be repeated as needed to reach the desired level of PGM impregnation. The resulting material can be stored as a dry powder or in slurry form.

Alternatively, PGM starting materials can be in the form of a colloidal dispersion of PGM nanoparticles rather than in solution form. Such colloidal suspensions can be applied to a support in an incipient wetness technique as described above. Methods of impregnating supports with colloidal PGM materials are described in US2017/0304805 to Xu et al. and US2019/0015781 to Wei et al., both of which are incorporated by reference herein in their entirety.

The average size of the PGM nanoparticles in a colloidal dispersion can vary. In some embodiments, the PGM nanoparticles in a given colloidal dispersion can have average particle sizes of about 1 nm to about 10 nm, e.g., about 1 nm to about 6 nm, such as an average particle size of about 1 nm, about 2 nm, about 3 nm, about 4 nm, or about 5 nm. Certain embodiments can have average particle sizes of about 1-2 nm, about 1-3 nm, about 1-4 nm, about 1-5 nm, about 1-6 nm, about 2-3 nm, about 2-4 nm, about 2-5 nm, about 2-6 nm, about 3-4, about 3-5 nm, about 3-6 nm, about 4-5 nm, about 4-6 nm, or about 5-6 nm.

Advantageously, the PGM nanoparticles in the colloidal dispersions disclosed herein are substantially monodisperse. In certain embodiments, the particles can be viewed as monodisperse, meaning the PGM nanoparticle population is highly uniform in particle size. Certain monodisperse particle populations useful in the present invention can be characterized as consisting of particles wherein at least 95% of the particles have a particle size within 50 percent of the average particle size for the particle population, or within 20 percent, or within 15 percent, or within 10 percent (i.e., wherein at least 95% of all particles in the population have a particle size within the given percentage range around the average particle size). In other embodiments, at least 96%, 97%, 98%, or 99% of all particles fall within these ranges. In one exemplary embodiment, the average particle size is about 2 nm and at least 95% of all particles (or at least 96%, 97%, 98%, 99%, or 100%) of all particles in the population have a particle size in the range of about 1 nm to about 3 nm (i.e., within about 50 percent of the average particle size). Specific PGM nanoparticle dispersions can comprise substantially monodisperse dispersions, with average PGM nanoparticle particle sizes of about 2 nm, about 3 nm, about 4 nm, and about 5 nm.

Particle sizes and size distribution of PGM nanoparticles can be determined using Transmission Electron Microscopy (TEM). Such values can be found by visually examining a TEM image, measuring the diameter of the particles in the image, and calculating the average particle size of the measured particles based on magnification of the TEM image. The particle size of a particle refers to the smallest diameter sphere that will completely enclose the particle, and this measurement relates to an individual particle as opposed to an agglomeration of two or more particles. The above-noted size ranges are average values for particles having a distribution of sizes.

Advantageously, the PGM in colloidal dispersions useful according to the disclosure is substantially in fully reduced form, meaning that at least about 90% of the platinum group metal content (i.e., the bulk of the nanoparticle) is reduced to the metallic form (PGM(0)). In some embodiments, the amount of PGM in fully reduced form is even higher, e.g., at least about 92%, at least about 94%, at least about 95%, at least about 96%, at least about 97%, at least about 98%, or at least about 99% of the PGM is in fully reduced form. The amount of PGM(0) can be determined using ultrafiltration, followed by Inductively Coupled Plasma/Optical Emission Spectrometry (ICP-OES). In this method, the unreduced PGM species in the colloidal dispersion can be separated from the PGM(0) nanoparticles, and then the PGMNPs can be quantified by ICP-OES.

Low-Temperature $NO_x$ Adsorber (LT-NA)

A LT-NA as disclosed herein comprises a molecular sieve comprising a platinum group metal (PGM) component. Such LT-NA components are effective for storing the $NO_x$ at temperatures below 200° C., and releasing the stored $NO_x$ at higher temperatures.

As used herein, the term "molecular sieve," such as a zeolite and other zeolitic framework material (e.g. isomorphously substituted material), refers to materials based on an extensive three-dimensional network of oxygen anions connected to metal atoms (such as Si, Al, etc.) in generally tetrahedral type sites and having a substantially uniform pore distribution, with the average pore size being no larger than 20 Angstroms (Å).

Molecular sieves can be differentiated mainly according to the geometry of the voids which are formed by the rigid network of the $(SiO_4)/AlO_4$ tetrahedra. The entrances to the voids are surrounded by rings comprising 6, 8, 10, 12 or 14 oxygen atoms comprising the 6, 8, 10, 12 or 14 (SiO4)/AlO4 tetrahedra which form the entrance opening. Molecular sieves are crystalline materials having rather uniform pore sizes which, depending upon the type of molecular sieves and the type and amount of cations included in the molecular sieves lattice, range from about 3 to 10 Å in diameter. The phrase "8-ring" molecular sieve refers to a molecular sieves having 8-ring pore openings and double-six ring secondary building units and having a cage like structure resulting from the connection of double six-ring building units by 4 rings. Molecular sieves comprise small pore, medium pore and large pore molecular sieves or combinations thereof. The pore sizes are defined by the ring size.

A small pore molecular sieve contains channels defined by up to eight tetrahedral atoms. As used herein, the term "small pore" refers to pore openings which are smaller than about 5 Angstroms, for example on the order of ~3.8 Angstroms. Exemplary small pore molecular sieves include framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures or intergrowths thereof.

A medium pore molecular sieve contains channels defined by ten-membered rings. Exemplary medium pore molecular sieves include framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN and mixtures or intergrowths thereof.

A large pore molecular sieve contains channels defined by twelve-membered rings. Exemplary large pore molecular sieves include framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL4, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET and mixtures or intergrowths thereof.

Typically, any framework type of molecular sieve can be used, such as framework types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AVL, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EEI, EMT, EON, EPI, ERI, ESV, ETR, EUO, FAU, FER, FRA, GIS, GIU, GME, GON, GOO, HEU, IFR, IFY, IHW, IRN, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWF, MWW, NAB, NAT, NES, NON, NPO, NPT, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SFW, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof. For example, in certain embodiments, the molecular sieve may comprise a framework type selected from the group consisting of CHA (chabazite), FER (ferrierite), and LEV (levyne).

As used herein, the term "zeolite" refers to a specific example of a molecular sieve that includes silicon and aluminum atoms. Generally, a zeolite is defined as an aluminosilicate with an open 3-dimensional framework structure composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable. Aluminosilicate zeolite structures do not include phosphorus or other metals isomorphically substituted in the framework. That is, "aluminosilicate zeolite" excludes aluminophosphate materials such as SAPO, AlPO and MeAlPO materials, while the broader term "zeolite" includes aluminosilicates and aluminophosphates. For the purposes of this disclosure, SAPO, AlPO and MeAlPO materials are considered non-zeolitic molecular sieves.

A zeolite may comprise $SiO_4/AlO_4$ tetrahedra that are linked by common oxygen atoms to form a three-dimensional network. The molar ratio of silica-to-alumina ("SAR") of a present zeolite can vary over a wide range, but is generally 2 or greater. For instance, a present zeolite may have a SAR of from about 5 to about 1000, such as about 10 to about 100 or about 10 to about 50 or about 15 to about 30.

The molecular sieve of the LT-NA is impregnated with a PGM component. As used herein, reference to impregnation with a PGM component includes all forms of association of the PGM component with the molecular sieve, such as where the PGM component resides either in the ion-exchange sites of the molecular sieve or other internal locations within the molecular sieve, or where the PGM is present on the surface of the molecular sieve, or any combination of the above-noted locations.

The term "PGM component" refers to any component that includes a PGM (e.g., Ru, Rh, Os, Ir, Pd, Pt). Reference to "PGM component" allows for the presence of the PGM in any valence state. For example, the PGM may be in metallic form, with zero valence, or the PGM may be in an oxide form. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide. In some embodiments, the PGM component is palladium as the sole PGM component, although mixtures of PGM components could also be used.

The concentration of the PGM component can vary, but will typically be from about 0.01 wt. % to about 6 wt. % relative to the total dry weight of the molecular sieve. The PGM component may be present in the molecular sieve, for example, from about 0.1%, about 0.2%, about 0.5%, about 0.7%, about 0.9% or about 1.0%, to about 1.5%, about 2.0%, about 2.5%, about 3.0%, about 3.5%, about 4.0%, about 4.5%, about 5.0%, or about 6% by weight, based on the total dry weight of the molecular sieve. Weights of the PGM component are measured and reported as the metal (e.g., weight of palladium). The total dry weight of the molecular sieve includes any added/exchanged metals (i.e., palladium).

Alternatively, the amount of PGM component in the LT-NA composition can be expressed as weight per unit volume of substrate. For example, in certain embodiments, the amount of PGM component in the LT-NA is about 10 $g/ft^3$ to 140 $g/ft^3$ or about 40 $g/ft^3$ to about 100 $g/ft^3$ (based on the volume of an underlying substrate upon which the catalyst is disposed).

The LT-NA compositions are generally present on a substrate at a concentration of, for instance, from about 0.3 to 5.5 $g/in^3$, or from about 0.4 $g/in^3$, about 0.5 $g/in^3$, about 0.6 $g/in^3$, about 0.7 $g/in^3$, about 0.8 $g/in^3$, about 0.9 $g/in^3$ or about 1.0 $g/in^3$ to about 1.5 $g/in^3$, about 2.0 $g/in^3$, about 2.5 $g/in^3$, about 3.0 $g/in^3$, about 3.5 $g/in^3$, about 4.0 $g/in^3$, about 4.5 $g/in^3$, about 5.0 $g/in^3$ or about 5.5 $g/in^3$, based on the volume of the substrate.

Preparation of LT-NA Compositions

The LT-NA as disclosed herein may be readily prepared by processes well known in the art. The disclosed LT-NA may, in some embodiments, be prepared via an incipient wetness impregnation method. Typically, a metal precursor (e.g., a PGM component) is dissolved in an aqueous or organic solution and then the metal-containing solution is added to the material to be impregnated (e.g., molecular sieve), and which contains essentially the same pore volume as the volume of the solution that was added. Capillary action draws the solution into the pores of the material. Solution added in excess of the material pore volume causes the solution transport to change from a capillary action process to a diffusion process, which is much slower. The impregnated material can then be dried and optionally calcined to remove the volatile components within the solution, depositing the metal on the surface of the material. The maximum loading is limited by the solubility of the precursor in the solution. The concentration profile of the impregnated material depends on the mass transfer conditions within the pores during impregnation and drying.

For example, a PGM component precursor (such as, for example, palladium nitrate) may be supported on the molecular sieve by impregnation, adsorption, ion-exchange, incipient wetness, precipitation, or the like. Non-limiting examples of suitable PGM precursors include palladium nitrate, tetraammine palladium nitrate, tetraammine platinum acetate, and platinum nitrate. Alternatively, PGM colloidal dispersions as discussed above could be used. During the calcination steps, or at least during the initial phase of use of the catalyst, such compounds are converted into a catalytically active form of the metal or a compound thereof.

Substrates

The DOC and LT-NA compositions of the invention are typically disposed on a substrate. Useful substrates are 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed component(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst composition. In some embodiments, the substrate comprises a honeycomb substrate in the form of a wall-flow filter or a flow-through substrate.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. A metallic substrate may include any metallic substrate, such as those with openings or "punchouts" in the channel walls. The metallic substrates may be employed in various shapes such as pellets, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt % (weight percent) of the alloy, for instance, about 10 to about 25 wt % chromium, about 1 to about 8 wt % of aluminum, and from 0 to about 20 wt % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith. Metallic substrates, in particular, are advantageously employed in certain embodiments in a close-coupled position, allowing for fast heat-up of the substrate and, correspondingly, fast heat up of a catalyst composition coated therein.

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through and wall-flow substrates are also taught, for example, in US2017/0333883 to Mohanan et al., which is incorporated herein by reference in its entirety.

Flow-Through Substrates

In some embodiments, the substrate is a flow-through substrate (e.g., a monolithic flow-through substrate, including a monolithic flow-through honeycomb substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 in$^3$ to about 1200 in$^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

FIGS. 1A and 1B illustrate an exemplary substrate 2 in the form of a flow-through substrate coated with a coating composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, coating compositions can be applied in multiple, distinct layers if desired. In the illustrated embodiment, a coating composition consists of both a discrete bottom layer 14 (e.g., a LT-NA composition) adhered to the walls 12 of the carrier member and a second discrete top layer 16 (e.g., a DOC composition) coated over the bottom layer 14. The present invention can be practiced with one or more (e.g., two, three, or four or more) composition layers and is not limited to the two-layer embodiment illustrated in FIG. 1B. Further coating configurations are disclosed herein below.

Wall-Flow Filter Substrates

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes.

A cross-section view of a monolithic wall-flow filter substrate section is illustrated in FIG. 2, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusing through the porous cell walls 104 and exiting the open outlet cell ends. Plugged ends 100 prevent gas flow and encourage diffusion through the cell walls. Each cell wall will have an inlet side 104$a$ and outlet side 104$b$. The passages are enclosed by the cell walls.

The wall-flow filter article substrate may have a volume of, for instance, from about 50 cm$^3$, about 100 cm$^3$, about 200 cm$^3$, about 300 cm$^3$, about 400 cm$^3$, about 500 cm$^3$, about 600 cm³, about 700 cm³, about 800 cm³, about 900 cm³ or about 1000 cm³ to about 1500 cm³, about 2000 cm³, about 2500 cm³, about 3000 cm³, about 3500 cm³, about 4000 cm³, about 4500 cm³ or about 5000 cm³. Wall-flow filter substrates typically have a wall thickness from about 50 microns to about 2000 microns, for example from about 50 microns to about 450 microns or from about 150 microns to about 400 microns.

The walls of the wall-flow filter are porous and generally have a wall porosity of at least about 50% or at least about 60% with an average pore size of at least about 5 microns prior to disposition of the functional coating. For instance, the wall-flow filter article substrate in some embodiments will have a porosity of ≥50%, ≥60%, ≥65% or ≥70%. For instance, the wall-flow filter article substrate will have a wall porosity of from about 50%, about 60%, about 65% or about 70% to about 75%, about 80% or about 85% and an average pore size of from about 5 microns, about 10, about 20, about 30, about 40 or about 50 microns to about 60 microns, about 70, about 80, about 90 or about 100 microns prior to disposition of a catalytic coating. The terms "wall porosity" and "substrate porosity" mean the same thing and are interchangeable. Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Useful wall-flow filters have high porosity, allowing high loadings of catalyst compositions without excessive backpressure during operation.

Coatings

The LT-NA and DOC compositions as disclosed herein are coated on a substrate, such as the substrates noted herein. The coatings may comprise one or more thin, adherent coating layers disposed on and in adherence to least a portion of a substrate. The coatings may be on the substrate wall surfaces and/or in the pores of the substrate walls, that is "in" and/or "on" the substrate walls. Thus, the phrase "a coating disposed on the substrate" means on any surface, for example on a wall surface and/or on a pore surface.

The LT-NA and DOC compositions are typically applied in the form of a washcoat. A washcoat is formed by preparing a slurry containing a specified solids content (e.g., about 10 to about 60% by weight) in a liquid vehicle, which is then applied to a substrate and dried and calcined to provide a coating layer. If multiple coating layers are applied, the substrate is typically dried and calcined after each layer is applied and/or after the number of desired multiple layers are applied.

The washcoat slurries may optionally contain a binder (e.g., alumina, silica), water-soluble or water-dispersible stabilizers, promoters, associative thickeners, and/or surfactants (including anionic, cationic, non-ionic or amphoteric surfactants). For example, a washcoat can include a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica. When present, the binder is typically used in an amount of about 1-5 wt % of the total washcoat loading.

Optionally, as noted above, the slurry containing a DOC composition may contain one or more hydrocarbon (HC) storage component for the adsorption of hydrocarbons (HC). Any known hydrocarbon storage material can be used, e.g., a micro-porous material such as a zeolite or zeolite-like material. Preferably, the hydrocarbon storage material is a zeolite. The zeolite can be a natural or synthetic zeolite such as faujasite, chabazite, clinoptilolite, mordenite, silicalite, zeolite X, zeolite Y, ultrastable zeolite Y, ZSM-5 zeolite, offretite, or a beta zeolite. Preferred zeolite adsorbent materials have a high silica to alumina ratio. The zeolites may have a silica/alumina molar ratio of at least about 25:1, preferably at least about 50:1, with useful ranges of from about 25:1 to 1000:1, 50:1 to 500:1, and about 25:1 to 300:1. Preferred zeolites include ZSM-5, Y, and beta zeolites. A particularly preferred adsorbent may comprise a beta zeolite of the type disclosed in U.S. Pat. No. 6,171,556, which is incorporated herein by reference in its entirety. When present, zeolites or other HC storage components are typically used in an amount of about 0.05 g/in³ to about 1 g/in³.

A typical pH range for the slurry is about 3 to about 6. Addition of acidic or basic species to the slurry can be carried out to adjust the pH accordingly. For example, in some embodiments, the pH of the slurry is adjusted by the addition of ammonium hydroxide or aqueous nitric acid.

The slurry can be milled to enhance mixing of the particles and formation of a homogenous material. The milling can be accomplished in a ball mill, continuous mill, or other similar equipment, and the solids content of the slurry may be, e.g., about 20-60 wt %, more particularly about 20-40 wt %. In one embodiment, the post-milling slurry is characterized by a D90 particle size of about 10 to about 40 microns, preferably 10 to about 30 microns, more preferably about 10 to about 15 microns.

The slurry is then coated on the substrate using any washcoat technique known in the art. In one embodiment, the substrate is dipped one or more times in the slurry or otherwise coated with the slurry. Thereafter, the coated substrate is dried at an elevated temperature (e.g., 100-150° C.) for a period of time (e.g., 10 min-3 hours) and then calcined by heating, e.g., at 400-600° C., typically for about 10 minutes to about 3 hours. Following drying and calcining, the final washcoat coating layer can be viewed as essentially solvent-free.

After calcining, the washcoat loading obtained by the above described washcoat technique can be determined through calculation of the difference in coated and uncoated weights of the substrate. As will be apparent to those of skill in the art, the loading can be modified by altering the slurry rheology. In addition, the coating/drying/calcining process to generate a washcoat can be repeated as needed to build the coating to the desired loading level or thickness, meaning more than one washcoat may be applied.

The washcoat(s) can be applied such that different coating layers may be in direct contact with the substrate. Alternatively, one or more "undercoats" may be present, so that at least a portion of a catalytic or sorbent coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Different coating layers may be in direct contact with each other. Alternatively, different coating layers may not be in direct contact. Various coating layers can be viewed as an undercoat, an overcoat, or an interlayer. An undercoat is a layer "under" a coating layer, an overcoat is a layer "over" a coating layer and an interlayer is a layer "between" two coating layers. The interlayer(s), undercoat(s) and overcoat(s) may contain one or more functional compositions or may be free of functional compositions.

The various coatings (e.g., the DOC coating and the LT-NA coating) may advantageously be "zoned", comprising zoned layers. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

FIGS. 3A-3E show some possible coating layer configurations with two coating materials (although the disclosure is not limited thereto). Shown are monolithic substrate walls 200 extending from an inlet 102 to an outlet 103 onto which coating layers 201 and 202 are disposed. This is a simplified illustration, and in the case of a porous wall-flow substrate, not shown are pores and coatings in adherence to pore walls and not shown are plugged ends.

Figure 3A:
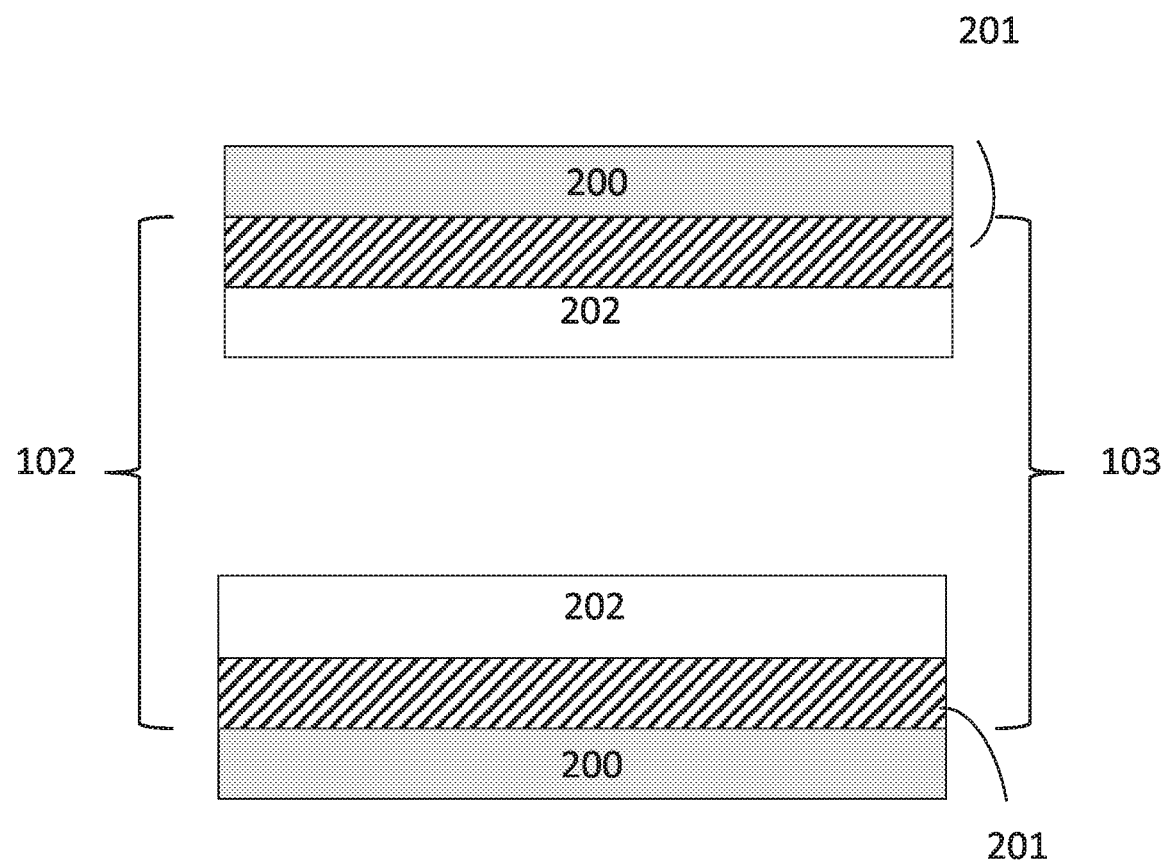
FIGS. 3A-3E are cross-sectional views of various embodiments of a catalyst article of the present disclosure.

FIG. 3A illustrates a layered configuration with both coating layer 201 (e.g., a coating layer comprising an LT-NA composition) and coating layer 202 (e.g., a DOC coating layer) extending along the entire length of the substrate 200.

Figure 3B:
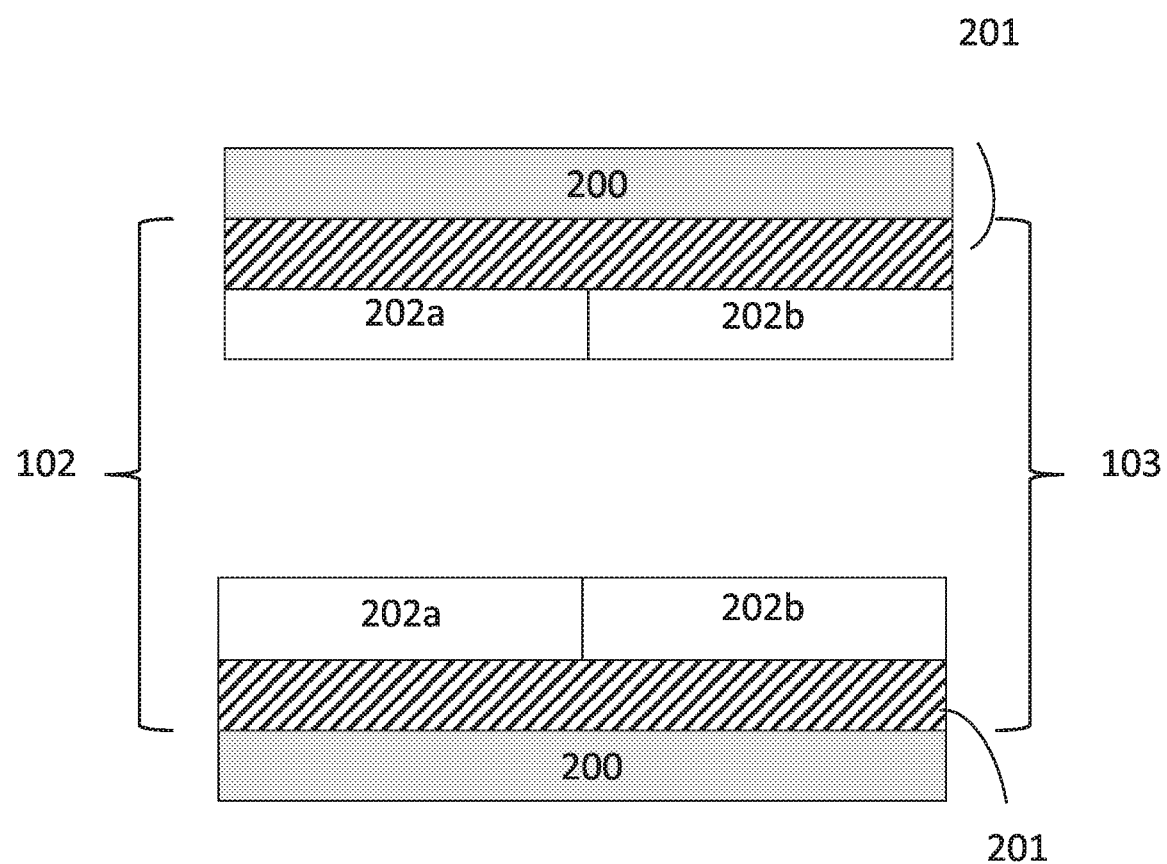

FIG. 3B is similar to FIG. 3A, except the top layer is zone coated with an upstream zone 202a and a downstream zone 202b. This configuration could be used, for example, where layer 201 comprises the LT-NA composition and downstream zone 202b is the DOC composition comprising platinum and a manganese-containing support. The upstream zone 202b could be a second DOC composition containing a refractory metal oxide support and one or more PGM components, but without a manganese-containing support.

Figure 3C:
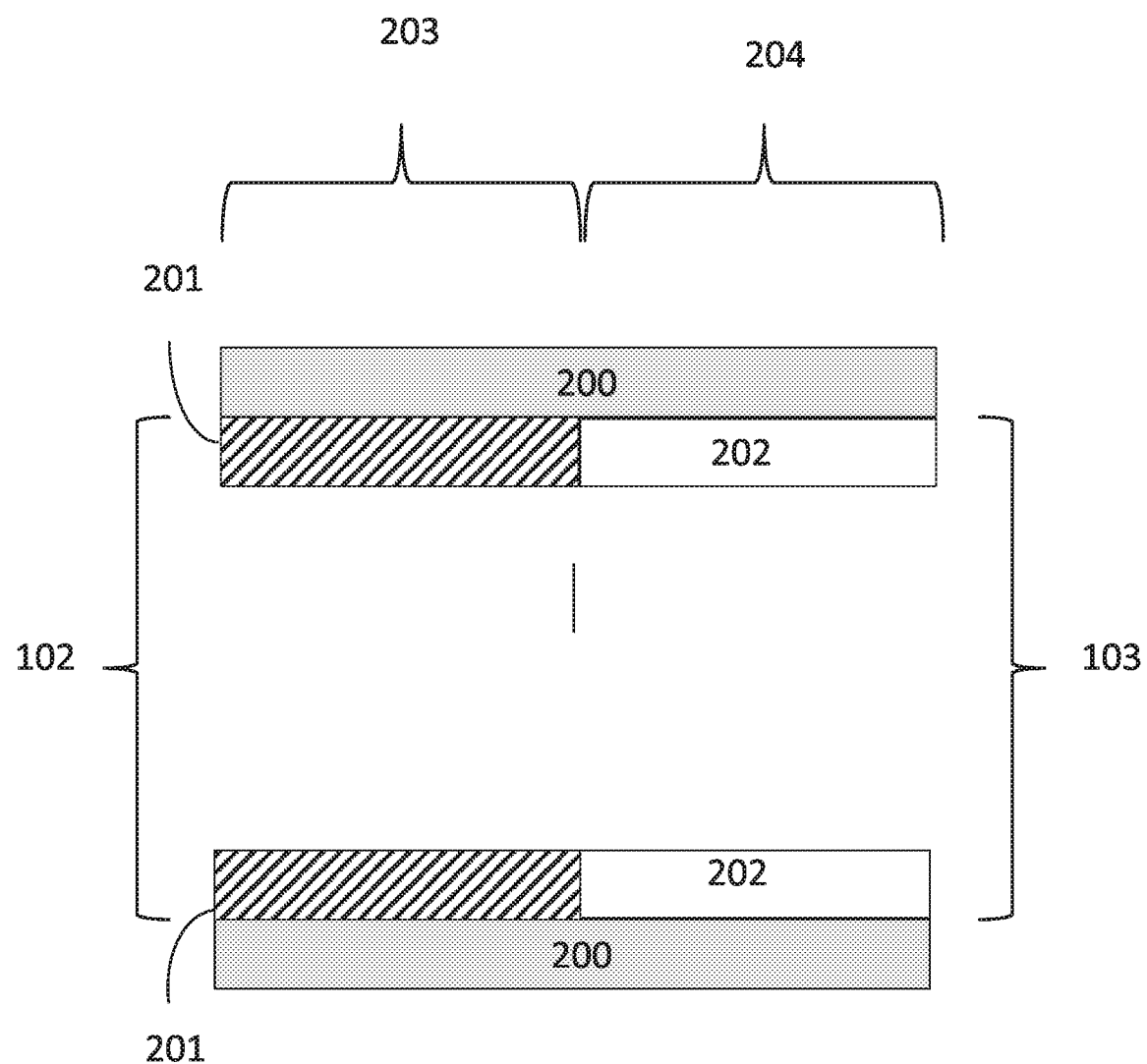
Figure 3D:
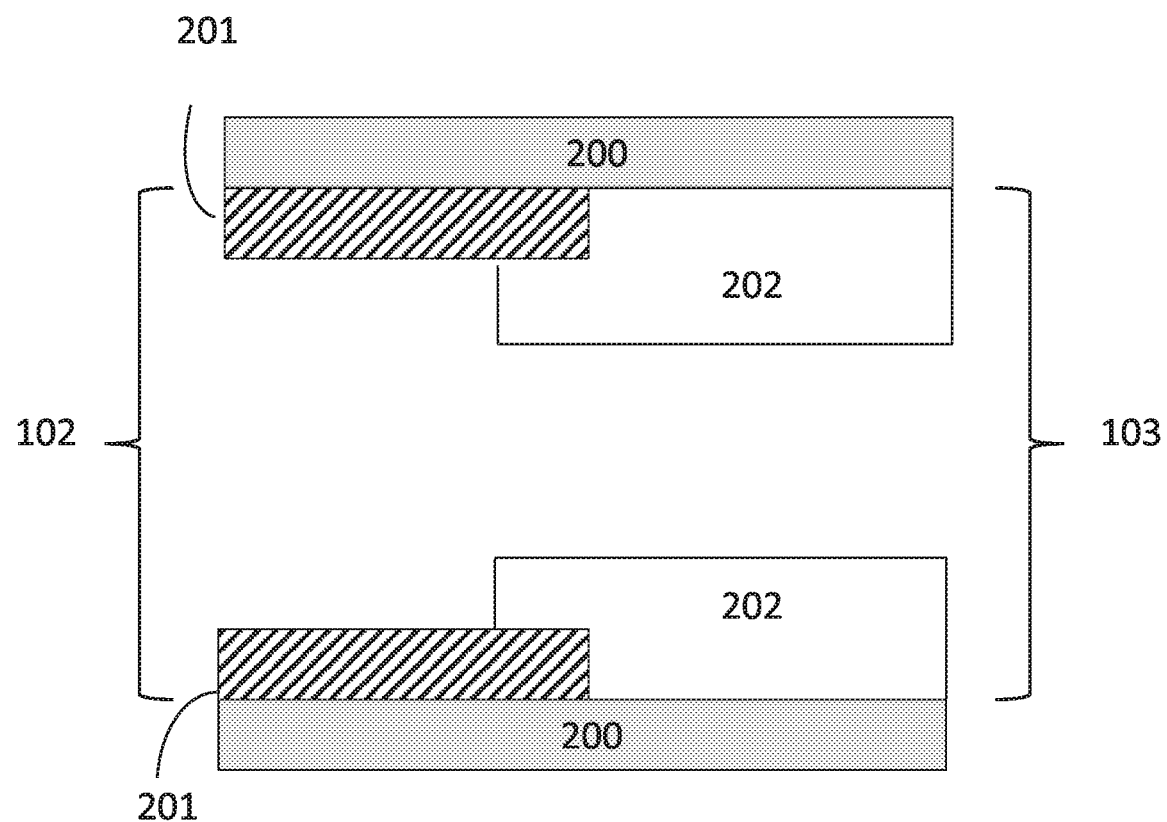

FIG. 3C illustrates a zoned coating configuration, wherein coating layer 201 (e.g., a coating layer comprising an LT-NA composition) extends from the inlet 102 for a portion of the substrate length and coating layer 202 (e.g., a DOC coating layer) extends from the outlet 103 for a portion of the substrate length, and the coating layers are adjacent each other, providing an inlet upstream zone 203 and an outlet downstream zone 204. FIG. 3D is similar to FIG. 3C, except coating layer 202 overlaps coating layer 201, creating a middle, overlapping zone.

Figure 3E:
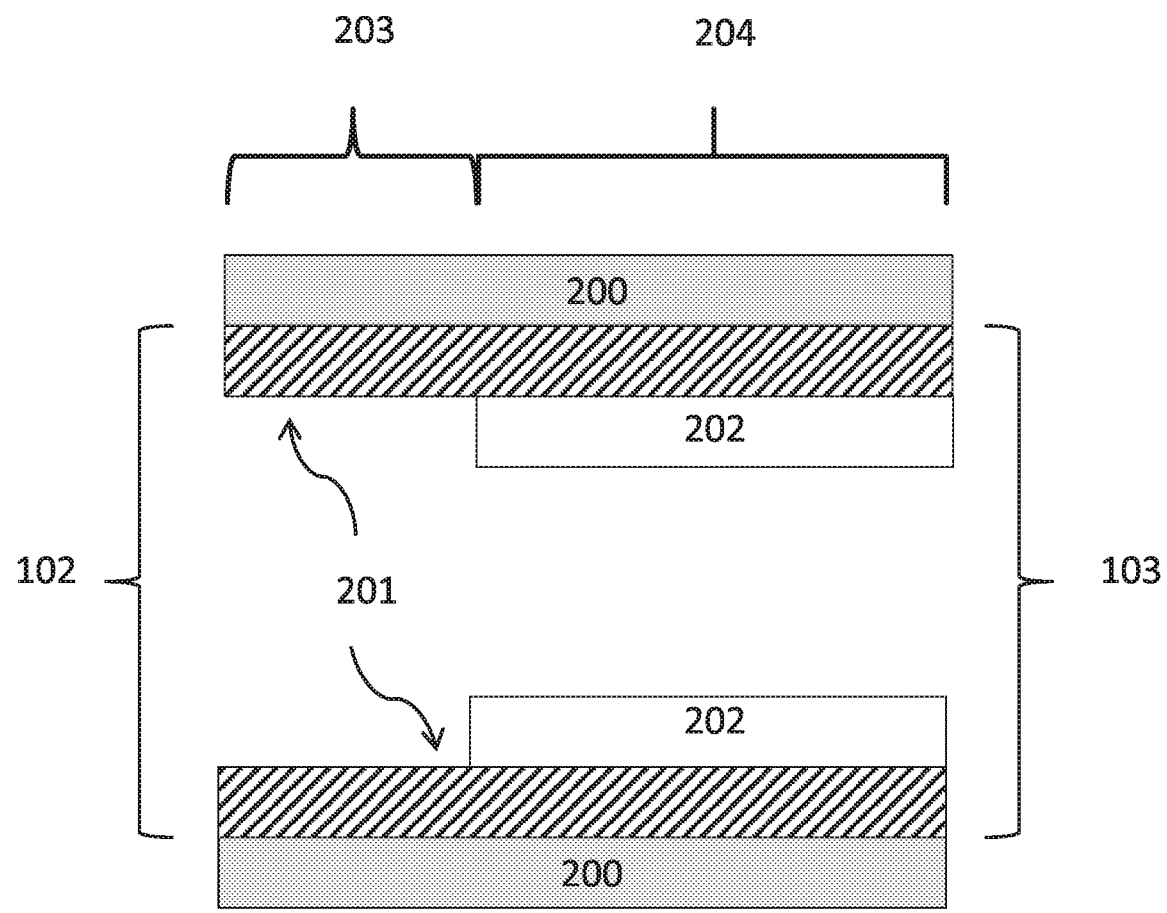

In FIG. 3E, coating layer 202 (e.g., a DOC coating layer) extends from the outlet for a portion of the substrate length and layer 201 (e.g., a coating layer comprising an LT-NA composition) extends along the entire length of the substrate 200.

In some embodiments, the LT-NA and the oxidation catalyst are disposed on a substrate (i.e., on the same substrate) in a zoned configuration, the substrate having an inlet end and an outlet end defining an overall length, wherein the LT-NA is disposed on the substrate extending from the inlet end to a length of from about 20% to about 100% of the overall length; and wherein the oxidation catalyst is disposed on the substrate extending from the outlet end to a length of from about 20% to about 100% of the overall length.

In some embodiments, the LT-NA coating layer is disposed directly on the substrate, and the oxidation catalyst coating layer is disposed directly on the substrate (i.e., there is no overlap between the two layers coating layers). In some embodiments, the oxidation catalyst coating layer partially overlaps the LT-NA coating layer. In certain embodiments, the LT-NA layer is disposed on the substrate extending from the inlet end to a length of about 20%, about 25%, about 30%, about 35%, about 40%, about 45%, about 50%, about 55%, about 60%, about 65%, about 70%, about 75%, or about 80% of the overall length, and the oxidation catalyst coating layer is disposed on the substrate extending from the outlet end to a length of about 20%, about 25%, about 30%, about 35%, about 40%, about 45%, about 50%, about 55%, about 60%, about 65%, about 70%, about 75%, or about 80% of the overall length. In some embodiments, the LT-NA is disposed directly on the substrate covering 100% of the overall length; and the oxidation catalyst is disposed on the LT-NA, covering from about 20% to about 80% of the overall length.

Emission Treatment System

In another aspect of the disclosure is provided an emission treatment system for the treatment of exhaust gas emissions from a diesel engine or a lean burn gasoline engine, the emission treatment system comprising the LT-NA and DOC components as disclosed herein. The emission treatment system may further comprise one or more additional catalytic components, such as a selective catalytic reduction (SCR) catalyst component. Examples of additional components also include a soot filter (which can be catalyzed or uncatalyzed), an ammonia or ammonia precursor injection component, an ammonia oxidation catalyst (AMOX), and combinations thereof. The relative placement of the various components of the emission treatment system can be varied; however, the LT-NA and DOC components of the present disclosure should be located upstream of any SCR catalyst components.

A suitable SCR component for use in the emission treatment system is able to effectively catalyze the reduction of the $NO_x$ exhaust component at temperatures as high as 650° C. Advantageously, the SCR component is capable of converting at least 50% of the $NO_x$ (e.g., NO) component to $N_2$, depending on the amount of reductant added to the system. Another desirable attribute for the SCR component is that it possesses the ability to catalyze the reaction of $O_2$ with any excess $NH_3$ to form $N_2$, so that $NH_3$ is not emitted to the atmosphere. Useful SCR components used in the emission treatment system should also have thermal resistance to temperatures greater than 650° C. Such high temperatures may be encountered during regeneration of a catalyzed soot filter. Suitable SCR catalyst components are described, for instance, in U.S. Pat. Nos. 4,961,917 and 5,516,497, which are both hereby incorporated by reference in their entirety. An example SCR catalyst is an iron- or copper-containing zeolite, such as Fe-CHA or Cu-CHA.

The emission treatment systems may employ a soot filter for removal of particulate matter. The soot filter may be located upstream or downstream from the DOC, but typically, the soot filter will be located downstream from the DOC. In some embodiments, the soot filter is a catalyzed soot filter (CSF). The CSF may comprise a substrate coated with washcoat particles containing one or more catalysts for burning trapped soot and or oxidizing exhaust gas stream emissions. In general, the soot burning catalyst can be any known catalyst for combustion of soot. For example, the CSF can be coated with one or more high surface area refractory oxides (e.g., an aluminum oxide or ceria-zirconia) for the combustion of CO and unburned hydrocarbons and to some degree particulate matter. The soot burning catalyst can be an oxidation catalyst comprising one or more precious metal catalysts (e.g., platinum and/or palladium).

Figure 4:
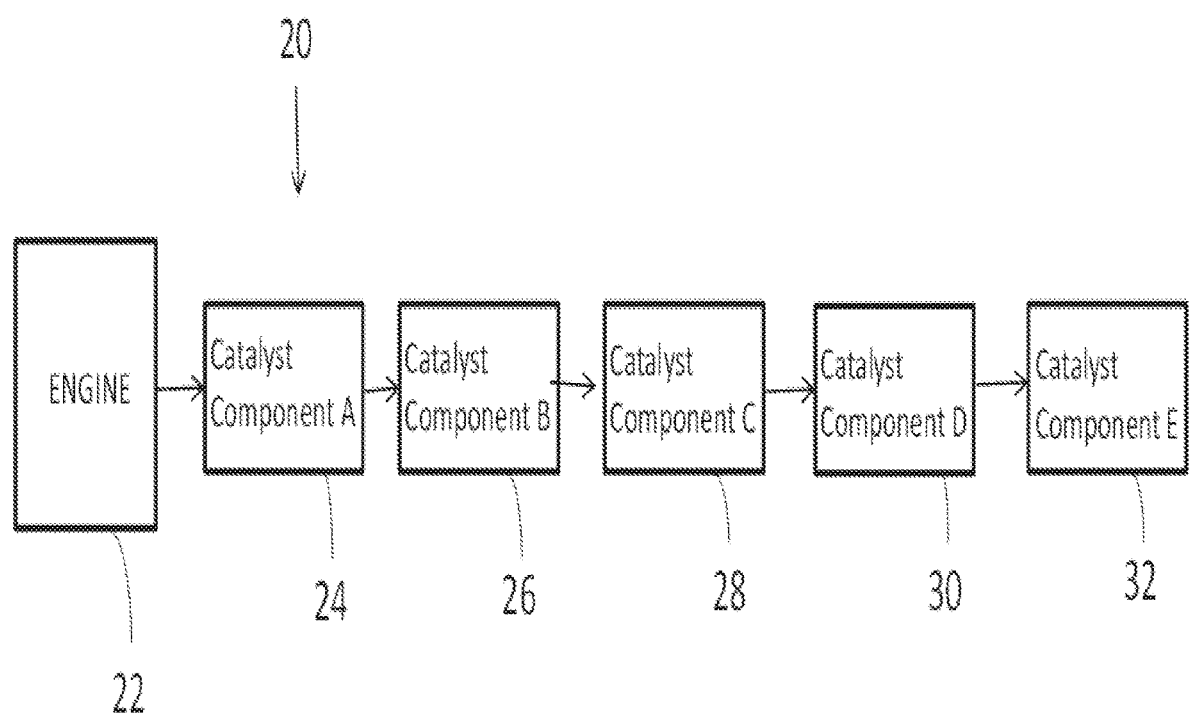
FIG. 4 is a schematic depiction of an embodiment of an emission treatment system.

One exemplary emission treatment system is illustrated in FIG. 4, which depicts a schematic representation of a non-limiting exhaust gas treatment system in accordance with embodiments of the present disclosure. As shown, the emission treatment system 20 can include a plurality of catalyst components in series downstream of an engine 22, such as a lean burn gasoline engine or diesel engine. At least one (or two if located on separate substrates) of the catalyst components will include the DOC catalyst and LT-NA composition as set forth herein. FIG. 4 illustrates five catalyst components, 24, 26, 28, 30, 32 in series; however, the total number of catalyst components can vary and five components is merely one example.

Without limitation, Table 1 presents various exhaust gas treatment system configurations of one or more embodiments. It is noted that each catalyst is connected to the next catalyst via exhaust conduits such that the engine is upstream of catalyst A, which is upstream of catalyst B, which is upstream of catalyst C, which is upstream of catalyst D, which is upstream of catalyst E (when present). The reference to Components A-E in the table can be cross-referenced with the same designations in FIG. 4.

Reference to DOC or LT-NA refers to the DOC or LT-NA as described herein, and DOC/LT-NA refers to the DOC composition and the LT-NA composition on the same substrate. Reference to SCR in the table refers to an SCR catalyst. Reference to SCRoF (or SCR on filter) refers to a particulate or soot filter (e.g., a wall flow filter) having SCR catalyst applied thereto. Reference to AMOx in the table refers to an ammonia oxidation catalyst, which can be provided downstream of an SCR to remove any slipped ammonia from the exhaust gas treatment system. As recognized by one skilled in the art, in the configurations listed in Table 1, any one or more of components A, B, C, D, or E can be disposed on a particulate filter, such as a wall flow filter, or on a flow-through honeycomb substrate. In one or more embodiments, an engine exhaust system comprises one or more catalyst compositions mounted in a position near the engine (in a close-coupled position, CC), with additional catalyst compositions in a position underneath the vehicle body (in an underfloor position, UF). In one or more embodiments, the exhaust gas treatment system may further comprise an ammonia or ammonia precursor injection component, typically placed upstream of any SCR catalyst present in the system.

TABLE 1

Possible exhaust gas treatment system configurations

| Component A | Component B | Component C | Component D | Component E |
|---|---|---|---|---|
| DOC/LT-NA | SCR | Optional AMOx | — | — |
| DOC/LT-NA | SCRoF | Optional AMOx | — | — |
| DOC/LT-NA | SCRoF | SCR | Optional AMOx | — |
| LT-NA | DOC | SCR | Optional AMOx | — |
| LT-NA | DOC | SCRoF | Optional AMOx | — |
| LT-NA | DOC | SCRoF | SCR | Optional AMOx |
| LT-NA | DOC | SCR | SCRoF | Optional AMOx |
| DOC | LT-NA | SCR | Optional AMOx | — |

Methods for Treating Exhaust Stream

In another aspect is provided a method for treating a gaseous exhaust stream comprising a mixture of nitrogen oxides ($NO_x$), as well as hydrocarbons and carbon monoxide, flowing from the exhaust manifold of a diesel engine or a lean-burn gasoline engine. Specifically, the method comprises contacting the gaseous exhaust stream with a low temperature $NO_x$ adsorber (LT-NA) component and an oxidation catalyst component as disclosed herein, disposed downstream of and in fluid communication with the exhaust manifold.

In some embodiments, the LT-NA component is effective for releasing one or both of NO and $NO_2$ at a temperature above about 300° C. In some embodiments, the LT-NA component is effective for releasing one or both of NO and $NO_2$ at a temperature above about 325° C. In some embodiments, the oxidation catalyst composition of the invention is effective to oxidize hydrocarbons and carbon monoxide in the exhaust stream and simultaneously convert NO to $NO_2$, including NO released from the LT-NA. The two compositions work together in a coordinated manner to improve downstream SCR catalyst performance by adsorbing $NO_x$ at low temperature and producing a higher $NO_2$ to $NO_x$ ratio.

The present compositions, components, systems, and methods are suitable for treatment of exhaust gas streams from mobile emissions sources such as trucks and automobiles. The present compositions, components, systems, and methods are also suitable for treatment of exhaust gas streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

EXAMPLES

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

Example 1

A cordierite honeycomb substrate (total volume of 1.85 L) was coated with a bottom coat of a H-FER (ferrierite) zeolite impregnated with palladium and calcined in air at 590° C. The concentration of palladium was 60 g/ft$^3$ and total washcoat loading was 2.85 g/in$^3$. An alumina binder layer was coated thereon (0.7 g/in$^3$).

An alumina support material comprising 5% by weight Mn was impregnated with platinum and palladium (9:1 weight ratio) using an incipient wetness technique. A topcoat containing this material was applied to the substrate, the washcoat including Fe-Beta and a barium promoter. The top coat contained 72 g/ft$^3$ platinum and 8 g/ft$^3$ palladium. Total washcoat loading was 1.95 g/in$^3$. This substrate is referred to as Substrate A below.

A second cordierite honeycomb substrate (total volume of 1.85 L) was coated with a bottom coat as in Substrate A above, except palladium loading was 80 g/ft$^3$ and total washcoat loading was 3 g/in$^3$. In addition, the bottom coat included a zirconia binder.

A top coat was coated in the second substrate with an inlet zone (50% length) comprising a conventional oxidation catalyst composition (37 g/ft$^3$ platinum and 3.7 g/ft$^3$ palladium on silica-stabilized alumina with total washcoat loading of 1.0 g/in$^3$) and an outlet zone (50% length) comprising platinum impregnated on an alumina support material comprising 5% by weight Mn (80 g/ft$^3$ platinum loading with total washcoat loading of 1.1 g/in$^3$). Both zones included Fe-Beta as hydrocarbon adsorbent. This substrate is referred to as Substrate B below.

Figure 5:
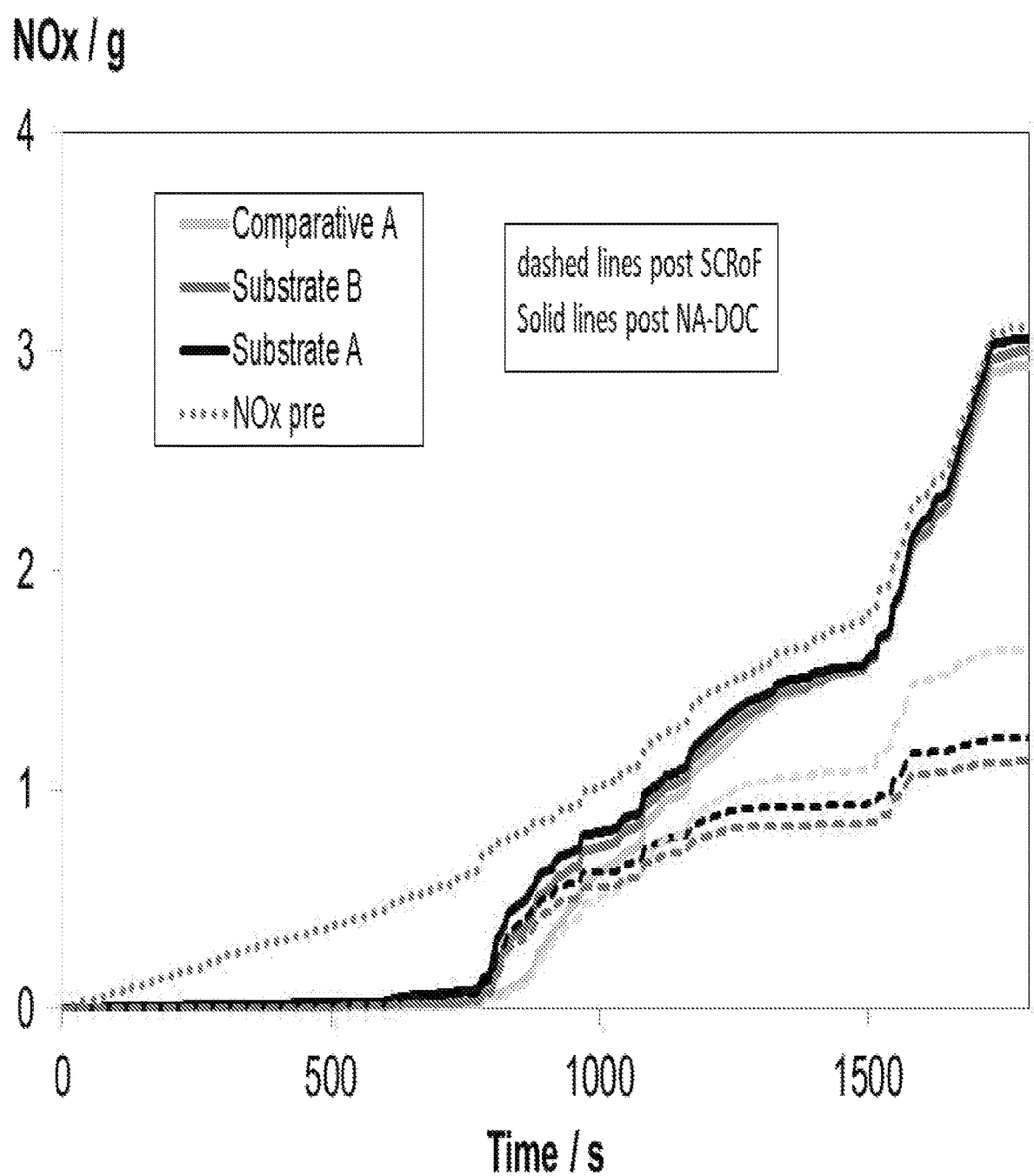
FIG. 5 is a graphical illustration of $NO_x$ produced at various points of emission treatment systems set forth in Example 1.

Substrate A and Substrate B, and a comparative substrate coated only with the bottom coat of Substrate A (denoted Comparative A) were tested in a Worldwide harmonized Light vehicle Test Cycle (WLTC) on a diesel engine after aging at 800° C. in 10% steam/air. The tests were conducted with an SCR catalyst article comprising copper-impregnated chabazite downstream from the substrates noted above. FIG. 5 provides the test results, with solid lines corresponding to $NO_x$ measurements after the substrates noted above (labeled "post NA-DOC" in figure legend) and dotted lines corresponding to NOx measurements after the downstream SCR (labeled "post SCRoF" in figure legend). All formulations adsorb most of the $NO_x$ in the exhaust leaving the engine up to about 800 s. However, after about 800 s, $NO_x$ starts to release from the formulations which include the DOC top layer (Substrates A and B) while the formulation without the DOC top layer (Comparative A) keeps adsorbing NOx for approximately 100 s longer before it then also starts to desorb.

The presence of the DOC appears to speed the desorption of $NO_x$ from the Pd/FER. Note that there is little difference between the solid and dotted lines for each formulation when desorption starts, indicating that the downstream SCR has not reached a temperature high enough to function. However, shortly thereafter, the dotted lines start to diverge from the solid lines and flatten out while the solid lines keep increasing. This is an indication that the SCR catalyst is becoming active for $NO_x$ removal.

Figure 6:
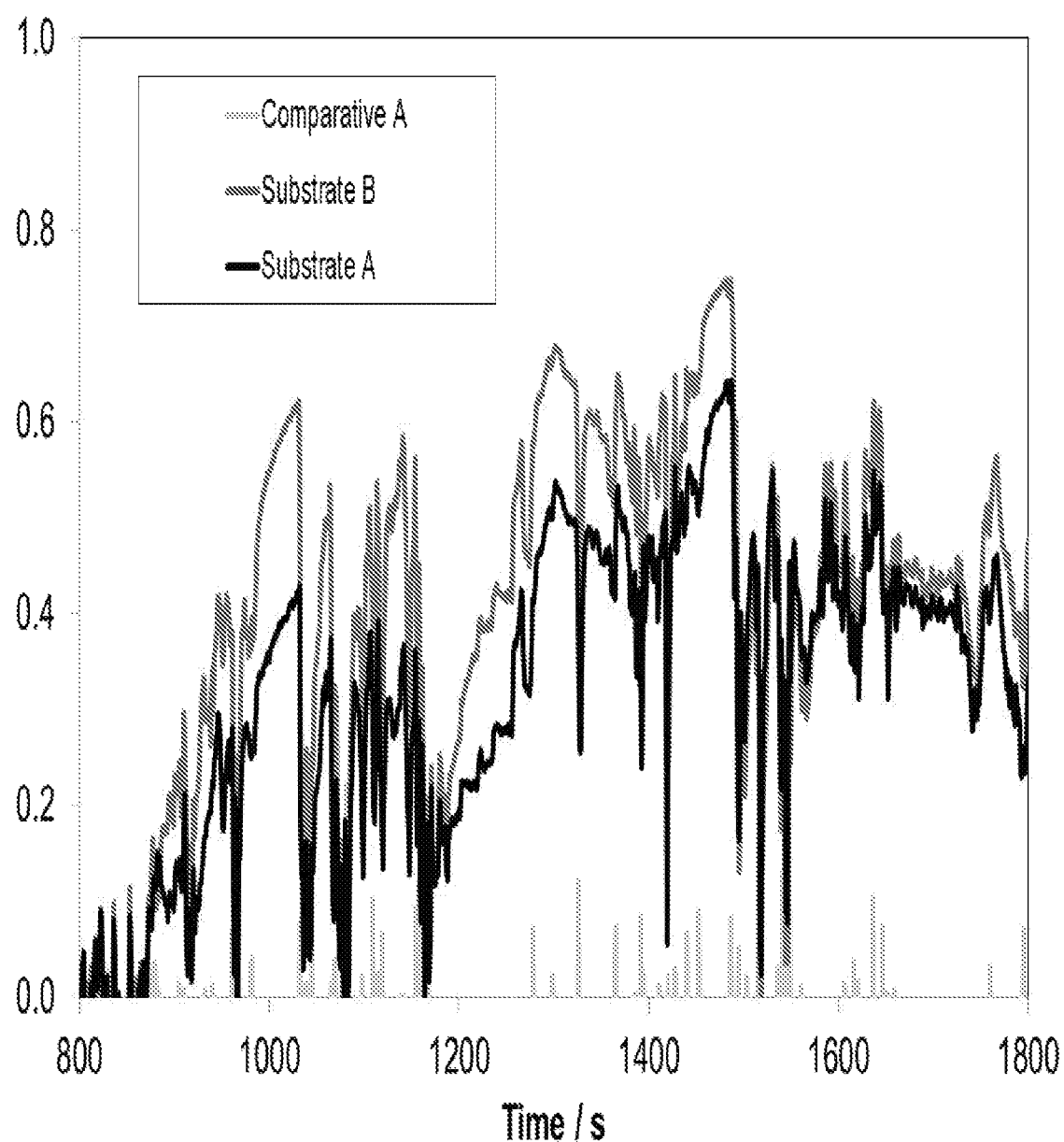
FIG. 6 is a graphical illustration of $NO_2/NO_x$ ratio produced by various emission treatment systems set forth in Example 1.

Furthermore, although the formulations that include the DOC top layer start to desorb $NO_x$ sooner than the Pd/FER by itself, the downstream SCR becomes more active for $NO_x$ removal when the Pt—Pd/Mn—Al$_2$O$_3$ DOC is present. By the end of the test, $NO_x$ emissions are significantly lower vs. the formulation comprising only Pd/FER. The reason for this improvement in $NO_x$ reduction performance is the enhanced formation of $NO_2$ over the formulations comprising a Pt—Pd/Mn—Al$_2$O$_3$ DOC. As illustrated in FIG. 6, formation of $NO_2$ over Pd/FER (Comparative A) after 800 s is virtually zero while formation of $NO_2$ over the formulations comprising a Pt—Pd/Mn—Al$_2$O$_3$ DOC (Substrates A and B) is high with the $NO_2$ to $NO_x$ ratio reaching 0.7.

An additional insight from this experiment is related to the architecture or design of the DOC top layer. When the DOC layer comprising Mn is coated over the entire length of the coated monolith, $NO_2$ formation is lower than when the DOC layer comprising Mn is coated only on the back half of the monolith (i.e., rear zone coating). Referring again to FIGS. 5 and 6, for Substrate A, the DOC top layer extends the entire length of the catalyst monolith. For Substrate B, two different DOC formulations are coated on top of the Pd/FER layer, but each is coated on only half of the monolith length (i.e., zoned DOC top layer). The front zone comprises Pt—Pd/Si—Al$_2$O$_3$ and Fe-Beta zeolite while the rear zone comprises Pt—Pd/Mn—Al$_2$O$_3$ and Fe-Beta zeolite. Relative to Substrate A, formation of $NO_2$ during the WLTC is higher for the zoned formulation. The improvement in $NO_2$ formation is attributed to concentrating the Pt—Pd/Mn—Al$_2$O$_3$ DOC component in the rear zone despite the overall lower Pt—Pd loading in the top layer of Substrate B vs. Substrate A (60 vs. 80 g/ft$^3$). Higher $NO_2$ formation directly translates to better performance after the downstream SCR.

Example 2

The amount of Pt associated with the Mn—Al$_2$O$_3$ support in the top DOC layer also plays an important role. To illustrate this point, two additional coated substrates were prepared. A substrate was prepared in a manner substantially identical to Substrate B above, and denoted Substrate C for this example. A further substrate was prepared similar to Substrate C, but with an increased amount of palladium in the bottom coat (120 g/ft$^3$ vs. 80 g/ft$^3$) and a decreased amount of platinum in the rear zone of the top coat (40 g/ft$^3$ vs. 80 g/ft$^3$), and this substrate was denoted Substrate D. These substrates were aged and tested as described in Example 1.

Figure 7:
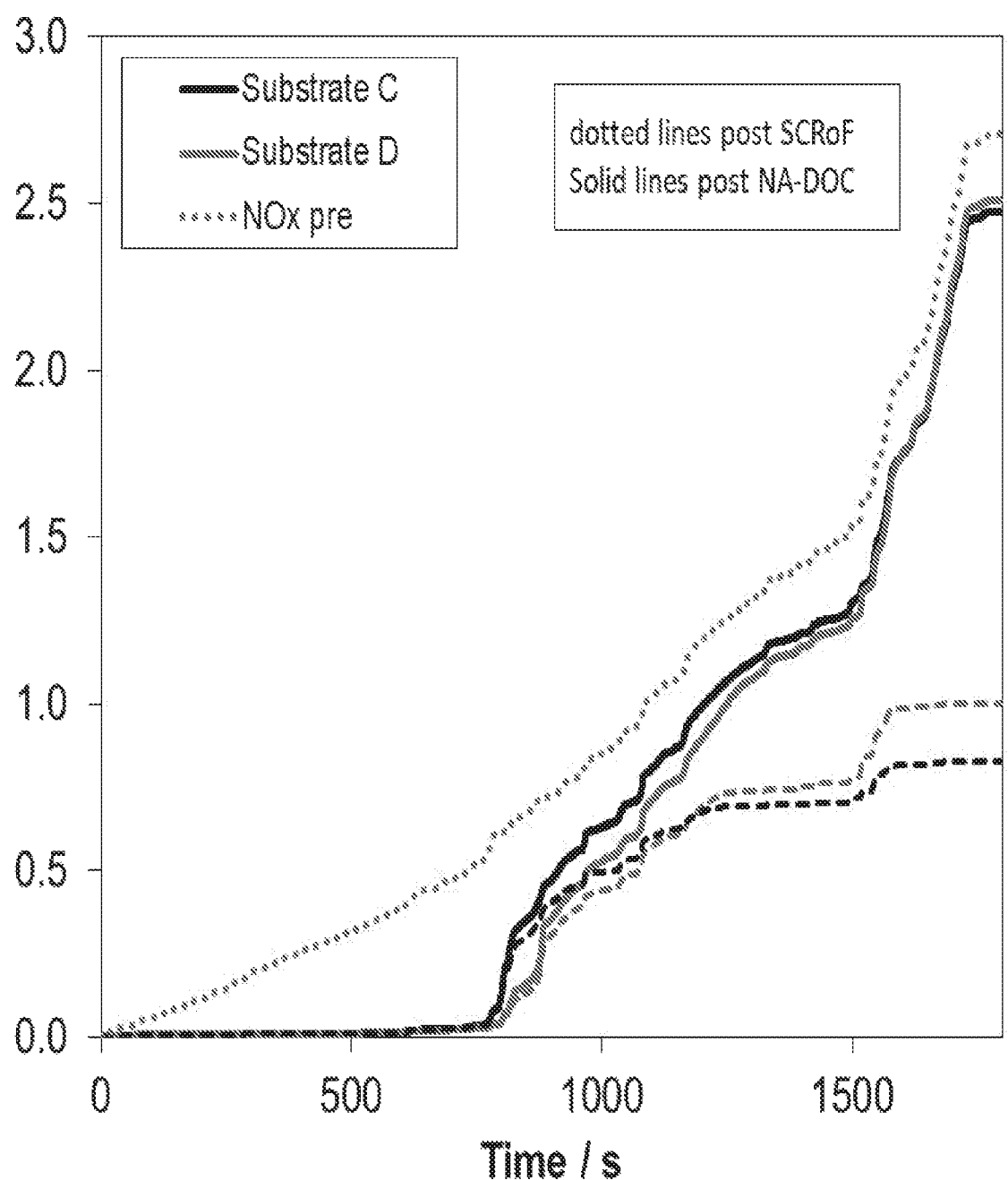
FIG. 7 is a graphical illustration of $NO_x$ produced at various points of emission treatment systems set forth in Example 2.
Figure 8:
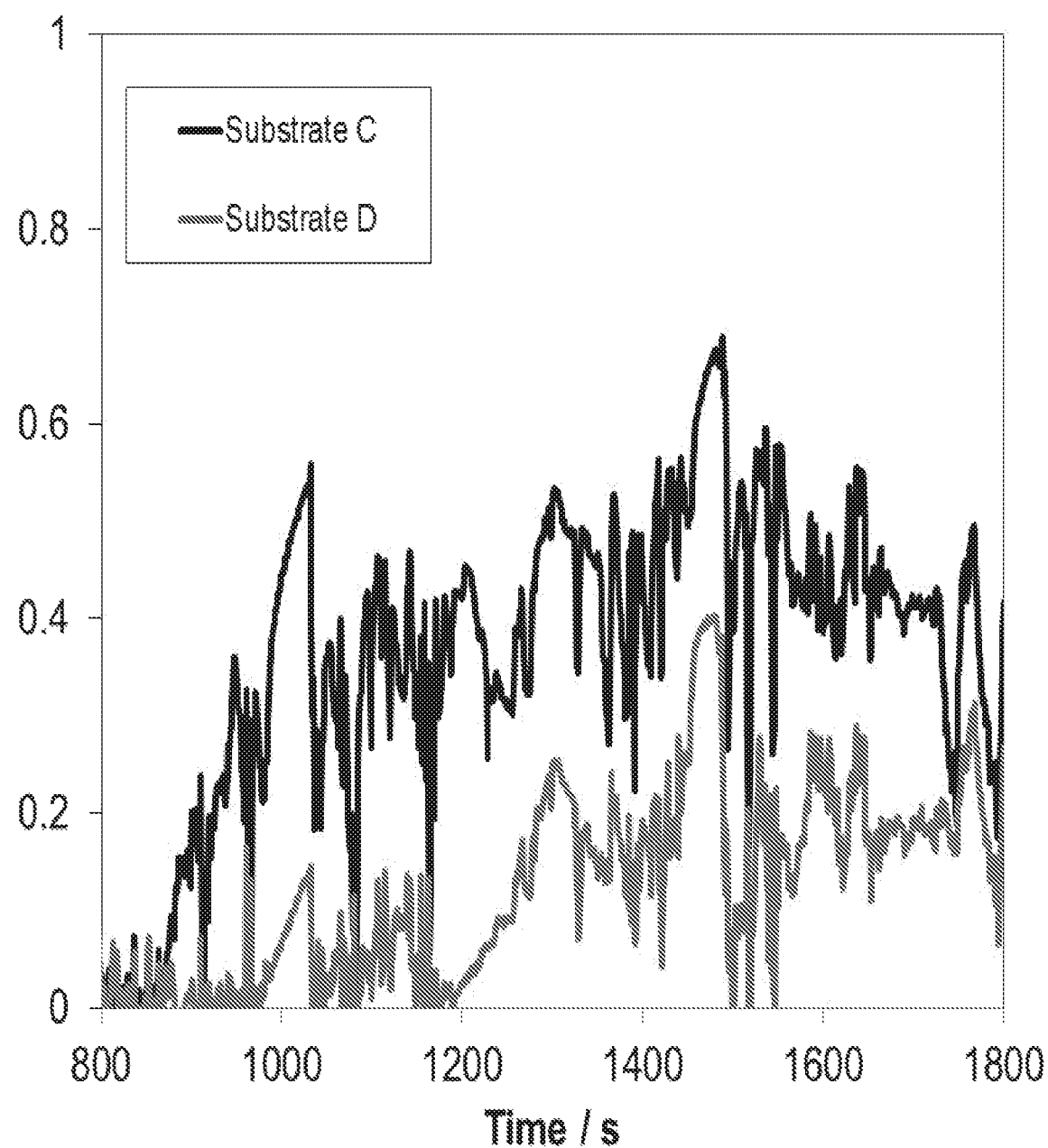
FIG. 8 is a graphical illustration of $NO_2/NO_x$ ratio produced by various emission treatment systems set forth in Example 2.

The results are illustrated in FIGS. 7 and 8. FIG. 7 plots the total $NO_x$ destruction performance over the WLTC test cycle on a diesel engine for Substrate C and Substrate D, with solid lines corresponding to $NO_x$ measurements after the test substrate and dotted lines corresponding to $NO_x$ measurements after the downstream SCR. Both test substrates adsorb most of the $NO_x$ in the exhaust leaving the engine up to about 800 s and then begin to release $NO_x$ after 800 s. However, for Substrate D with 120 g/ft$^3$ Pd in the zeolite bottom coat, the release of $NO_x$ is slower than for Substrate C with 80 g/ft$^3$ of Pd in the zeolite bottom coat. The higher loading of Pd in Substrate D allows it to store $NO_x$ more efficiently resulting in lower $NO_x$ emissions up to 1500 s. Note that at the start of $NO_x$ desorption at ~800 s, there is little difference between the solid and dotted lines for each formulation indicating that the downstream SCR has not reached a temperature high enough to function. However, shortly thereafter, the dotted lines start to diverge from the solid lines and flatten out while the solid lines keep increasing. This is an indication that the SCR catalyst is becoming active for $NO_x$ removal.

Furthermore, although the formulation with less Pd in the zeolite bottom coat desorbs $NO_x$ sooner than the formulation with more Pd in the zeolite bottom coat, the downstream SCR becomes more active for $NO_x$ removal in the former case. By the end of the test, $NO_x$ emissions are significantly lower vs. the formulation comprising more Pd in the zeolite bottom coat. The reason for this improvement in $NO_x$ reduction performance is the enhanced formation of $NO_2$ over Substrate C with twice the Pt amount in the rear zone of the DOC top layer. As illustrated in FIG. 8, formation of $NO_2$ over Substrate C after 800 s is higher than for Substrate D.

Example 3

A further aspect of the invention is directed to the source or form of Pt used in combination with $Mn-Al_2O_3$ in the DOC layer. To illustrate this point, two additional coated substrates were prepared. A cordierite honeycomb substrate (total volume of 1.85 L) was coated with a bottom coat of an alumina support material comprising 5% by weight Si on alumina that was sequentially impregnated with Pd nitrate followed by a water-soluble Pt complex (MEA stabilized $Pt(OH)_6$) using an incipient wetness technique. The bottom coat contained 29.5 g/ft$^3$ platinum and 20.5 g/ft$^3$ palladium and also included a Ba promoter. Total washcoat loading was 1.65 g/in$^3$. A second alumina support comprising a physical mixture of 5% by weight Mn on alumina and 5% by weight Si on alumina was similarly impregnated with platinum and palladium using an incipient wetness technique. A topcoat containing this material was applied to the substrate, the washcoat also including Fe-Beta and a Ba promoter. The top coat contained 38 g/ft$^3$ platinum and 2 g/ft$^3$ palladium. Total washcoat loading was 1.42 g/in$^3$. This substrate is referred to as Substrate E below.

A second cordierite honeycomb substrate (total volume of 1.85 L) was similarly coated with bottom and top coats as in Substrate E above, except that a colloidal Pt precursor comprising particles of Pt metal less than 5 nm in size was used instead of the water-soluble Pt precursor. This substrate is referred to as Substrate F below.

Figure 9:
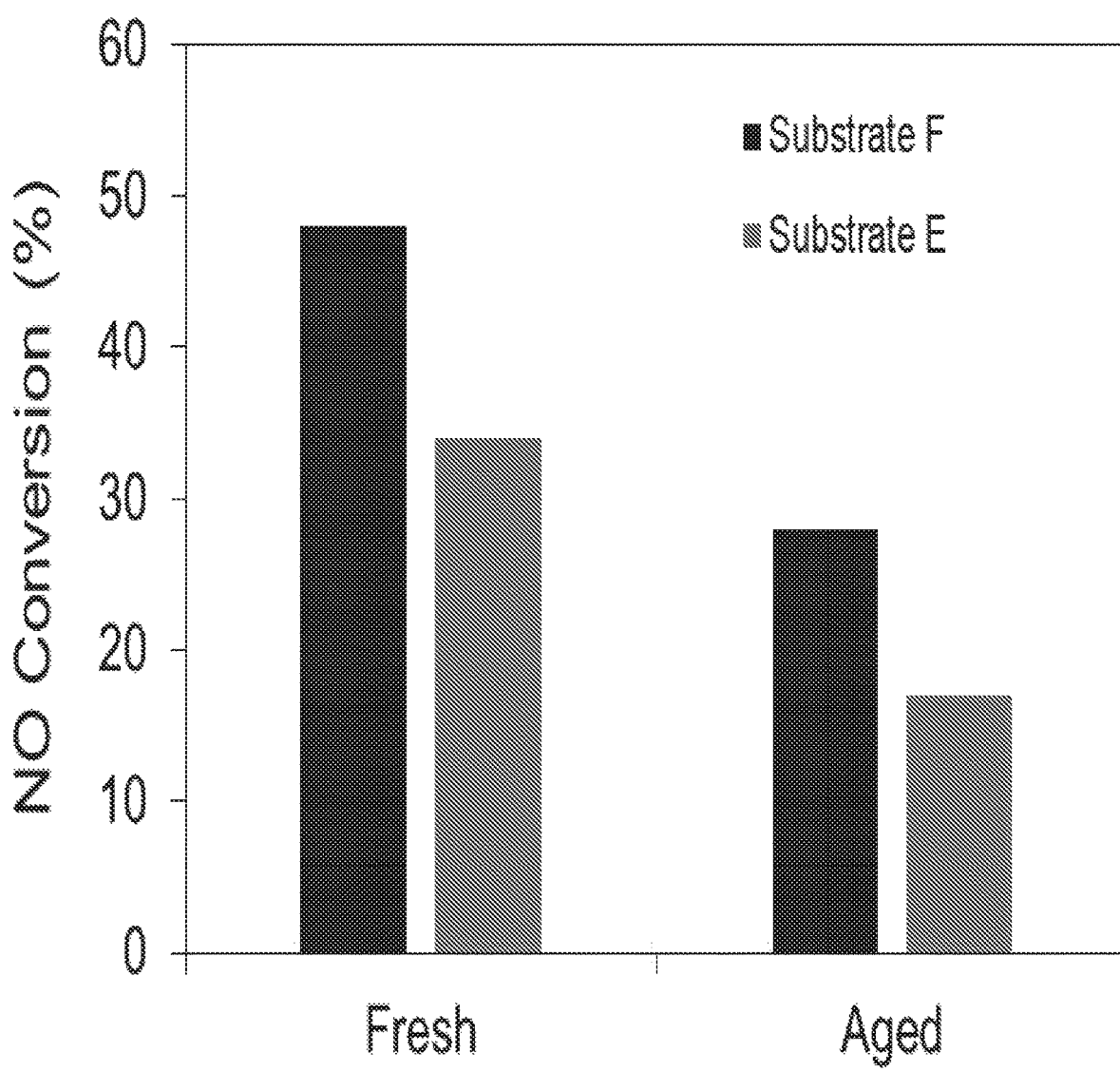
FIG. 9 is a graphical illustration of NO oxidation percentage for catalysts made according to Example 3.

As shown in FIG. 9, NO oxidation performance measured at the tailpipe of a diesel engine over the EUDC portion of the NEDC test cycle is lower for Substrate E, where a water-soluble Pt complex was used, rather than for Substrate F, where a colloidal Pt precursor comprising particles of Pt metal less than 5 nm in size was used.

What is claimed is:

1. An emission treatment system for oxidation of hydrocarbons and carbon monoxide and for $NO_x$ abatement in an exhaust stream of a lean burn engine, the emission treatment system comprising:
    a low-temperature $NO_x$ adsorber (LT-NA) comprising a molecular sieve impregnated with at least one platinum group metal (PGM) component positioned in fluid communication with the exhaust stream; and
    an oxidation catalyst comprising a refractory metal oxide support containing manganese impregnated with platinum positioned in fluid communication with the exhaust stream, each of the LT-NA and the oxidation catalyst being disposed on a substrate, wherein a content of manganese in the refractory metal oxide support is in a range of 3% to 10% by weight, based on a total weight of the refractory metal oxide support, and the refractory metal oxide support further comprises palladium, a weight ratio of platinum to palladium in the refractory metal oxide support being equal to or greater than 5:1.

2. The emission treatment system of claim 1, wherein the LT-NA and the oxidation catalyst are: (1) layered on the substrate with the LT-NA present in a first layer and the oxidation catalyst present in a second layer, the first layer positioned closer to the substrate than the second layer and at least partially overlapped by the second layer, or (2) in a zoned configuration on the substrate with the LT-NA in an upstream zone and the oxidation catalyst in a downstream zone; or (3) the LT-NA is present on a first substrate and the oxidation catalyst is present on a second substrate, the first substrate positioned upstream of the second substrate.

3. The emission treatment system of claim 2, wherein the LT-NA and the oxidation catalyst are disposed on the substrate in a zoned configuration, the substrate having an inlet end and an outlet end defining an overall length;
    wherein the LT-NA is disposed on the substrate extending from the inlet end to a length of from about 20% to about 100% of the overall length; and
    wherein the oxidation catalyst is disposed on the substrate extending from the outlet end to a length of from about 20% to about 100% of the overall length, the oxidation catalyst overlapping at least a portion of the LT-NA.

4. The emission treatment system of claim 3, wherein the oxidation catalyst is zone coated with a second oxidation catalyst comprising a refractory metal oxide support impregnated with one or more PGM components, wherein the second oxidation catalyst is substantially free of manganese and located upstream of the oxidation catalyst.

5. The emission treatment system of claim 1, further comprising at least one selective catalytic reduction (SCR) catalyst positioned downstream from both the LT-NA and the oxidation catalyst, or one or more of an ammonia or ammonia precursor injection component, a catalyzed soot filter (CSF), and an ammonia oxidation (AMOX) catalyst.

6. The emission treatment system of claim 1, wherein both the LT-NA and the oxidation catalyst are disposed on the substrate, and the substrate is a flow-through substrate in the form of a honeycomb having a plurality of longitudinally-extending gas flow passages extending from an inlet to an outlet.

7. The emission treatment system of claim 1, wherein the molecular sieve has a framework type selected from a group consisting of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, CHI, CLO, CON, CZP, DAC, DDR, DFO, DFT, DOH, DON, EAB, EDI, EEI, EMT, EON, EPI, ERI, ESV, ETR, EUO, EZT, FAU, FER, FRA, GIS, GIU, GME, GON, GOO, HEU, IFR, IFY, IHW, IMF, IRN, ISV, ITE, ITG, ITH, ITW, IWR, IWS, IWV, IWW, JBW, JRY, JSR, JST, KFI, LAU, LEV, LIO, LIT, LOS, LOV, LTA, LTF, LTL, LTN, MAR, MAZ, MEI, MEL, MEP, MER, MFI, MFS, MON, MOR, MOZ, MRE, MSE, MSO, MTF, MTN, MTT, MVY, MTW, MWF, MWW, NAB, NAT, NES, NON, NPO, NPT, NSI, OBW, OFF, OKO, OSI, OSO, OWE, PAR, PAU, PCR, PHI, PON, PUN, RHO, RON, RRO, RSN, RTE, RTH, RUT, RWR, RWY, SAF, SAO, SAS, SAT, SAV, SBE, SBS, SBT, SCO, SEW, SFE, SFF, SFG, SFH, SFN, SFO, SFS, SFW, SGF, SGT, SIV, SOD, SOF, SOS, SSF, SSY, STF, STI, STO, STT, STW, SVR, SZR, TER, THO, TON, TSC, TUN, UEI, UFI, UOS, UOZ, USI, UTL, UWY, VET, VFI, VNI, VSV, WIE, WEN, YUG, ZON, and mixtures or intergrowths thereof.

8. The emission treatment system of claim 1, wherein the molecular sieve is an aluminosilicate zeolite, or wherein the molecular sieve contains channels defined by rings of at least 10 members.

9. The emission treatment system of claim 1, wherein the oxidation catalyst further comprises rhodium, and wherein the LT-NA comprises palladium as a sole PGM component.

10. The emission treatment system of claim 1, wherein the oxidation catalyst comprises platinum in an amount in a range of about 10 g/ft$^3$ to 100 g/ft$^3$ impregnated on the refractory metal oxide support containing manganese.

11. The emission treatment system of claim 1, wherein the refractory metal oxide support comprises alumina, silica, zirconia, titania, ceria, or combinations thereof.

12. The emission treatment system of claim 1, wherein the manganese is present in a form selected from a group consisting of a Mn-containing solid solution with the refractory metal oxide support, Mn surface dispersed on the refractory metal oxide by impregnation, and discrete manganese oxide particles on the refractory metal oxide support.

13. The emission treatment system of claim 1, wherein the platinum impregnated on the refractory metal oxide support containing manganese is in a form of nanoparticles having an average particle size of about 1 to about 10 nm.

14. A method for oxidizing hydrocarbons and abating NO$_x$ in an exhaust stream from a lean burn engine, the method comprising contacting the exhaust gas stream with the emission treatment system of claim 1.

15. A catalyst article for treatment of exhaust from a lean burn engine, comprising:
   a substrate having an inlet end and an outlet end defining an overall length;
   a low-temperature NO$_x$ adsorber (LT-NA) comprising a molecular sieve impregnated with at least one platinum group metal (PGM) component disposed on the substrate; and
   an oxidation catalyst comprising a refractory metal oxide support containing manganese impregnated with platinum disposed on the substrate, wherein a content of manganese in the refractory metal oxide support is in a range of 3% to 10% by weight, based on a total weight of the refractory metal oxide support, and the refractory metal oxide support further comprises palladium, a weight ratio of platinum to palladium in the refractory metal oxide support being equal to or greater than 5:1,
   wherein the LT-NA and the oxidation catalyst are: (1) layered on the substrate with the LT-NA present in a first layer and the oxidation catalyst present in a second layer, the first layer positioned closer to the substrate than the second layer and at least partially overlapped by the second layer, or (2) in a zoned configuration on the substrate with the LT-NA in an upstream zone and the oxidation catalyst in a downstream zone.

16. The catalyst article of claim 15, wherein the LT-NA and the oxidation catalyst are disposed on the substrate in the zoned configuration;
   wherein the LT-NA is disposed on the substrate extending from the inlet end to a length of from about 20% to about 100% of the overall length; and
   wherein the oxidation catalyst is disposed on the substrate extending from the outlet end to a length of from about 20% to about 100% of the overall length, the oxidation catalyst overlapping at least a portion of the LT-NA.

17. The catalyst article of claim 15, wherein the oxidation catalyst is zone coated with a second oxidation catalyst comprising a refractory metal oxide support impregnated with one or more platinum group metal (PGM) components, wherein the second oxidation catalyst is substantially free of manganese and located upstream of the oxidation catalyst.

18. The catalyst article of claim 15, wherein the molecular sieve has a framework type selected from a group consisting of LEV, CHA, and FER.

19. The catalyst article of claim 15, wherein the molecular sieve is an aluminosilicate zeolite.

20. The catalyst article of claim 15, wherein the oxidation catalyst further comprises rhodium, and wherein the LT-NA comprises palladium as the sole PGM component.

21. The catalyst article of claim 15, wherein the oxidation catalyst comprises platinum in an amount in a range of about 10 g/ft$^3$ to 100 g/ft$^3$ impregnated on the refractory metal oxide support containing manganese.

22. The catalyst article of claim 15, wherein the refractory metal oxide support comprises alumina, silica, zirconia, titania, ceria, or combinations thereof.

* * * * *